United States Patent
Okuyama et al.

(10) Patent No.: US 10,634,953 B2
(45) Date of Patent: Apr. 28, 2020

(54) DISPLAY DEVICE

(71) Applicant: Japan Display Inc., Minato-ku (JP)

(72) Inventors: Kentaro Okuyama, Tokyo (JP); Yudai Numata, Tokyo (JP)

(73) Assignee: Japan Display Inc., Minato-ku (JP)

( * ) Notice: Subject to any disclaimer, the term of this patent is extended or adjusted under 35 U.S.C. 154(b) by 32 days.

(21) Appl. No.: 16/018,841

(22) Filed: Jun. 26, 2018

(65) Prior Publication Data

US 2019/0004377 A1 Jan. 3, 2019

(30) Foreign Application Priority Data

Jun. 30, 2017 (JP) .................................. 2017-129799

(51) Int. Cl.
| | |
|---|---|
| G02F 1/1337 | (2006.01) |
| G02F 1/1334 | (2006.01) |
| G02F 1/1333 | (2006.01) |
| G02F 1/1362 | (2006.01) |
| G02F 1/1335 | (2006.01) |
| G02F 1/1368 | (2006.01) |
| G02F 1/137 | (2006.01) |
| G09G 3/36 | (2006.01) |

(52) U.S. Cl.
CPC ...... *G02F 1/133711* (2013.01); *G02F 1/1334* (2013.01); *G02F 1/1368* (2013.01); *G02F 1/13725* (2013.01); *G02F 1/133345* (2013.01); *G02F 1/133512* (2013.01); *G02F 1/136286* (2013.01); *G02F 2001/13775* (2013.01); *G02F 2201/121* (2013.01); *G02F 2201/123* (2013.01); *G09G 3/3677* (2013.01); *G09G 2300/0426* (2013.01)

(58) Field of Classification Search
CPC ............. G02F 1/133711; G02F 1/1334; G02F 1/133345; G02F 1/136286; G02F 1/133512; G02F 1/1368; G02F 1/13725; G02F 2201/123; G02F 2201/121; G02F 2001/13775; G09G 3/3677; G09G 2300/0426
USPC ...................................................... 349/88–94
See application file for complete search history.

(56) References Cited

U.S. PATENT DOCUMENTS

| | | |
|---|---|---|
| 2010/0085510 A1 | 4/2010 | Okuyama et al. |
| 2010/0165450 A1 | 7/2010 | Okuyama et al. |
| 2011/0109663 A1 | 5/2011 | Uchida et al. |
| (Continued) | | |

FOREIGN PATENT DOCUMENTS

| | | |
|---|---|---|
| JP | 2010-092682 | 4/2010 |
| JP | 2010-156811 | 7/2010 |
| (Continued) | | |

*Primary Examiner* — Charles S Chang
(74) *Attorney, Agent, or Firm* — Oblon, McClelland, Maier & Neustadt, L.L.P.

(57) ABSTRACT

According to one embodiment, a display device includes a first substrate including a scanning line and a pixel electrode, a second substrate opposed to the first substrate, and a liquid crystal layer held between the first substrate and the second substrate and including streaky polymers and liquid crystal molecules, wherein the liquid crystal layer includes a first area overlapping the scanning line and a second area overlapping the pixel electrode, and the polymers of the first area are denser than the polymers of the second area.

16 Claims, 20 Drawing Sheets

(56) References Cited

U.S. PATENT DOCUMENTS

| | | | |
|---|---|---|---|
| 2014/0354930 A1* | 12/2014 | Hirato | G02F 1/133707 349/123 |
| 2015/0077679 A1* | 3/2015 | Chen | G02F 1/1362 349/43 |
| 2016/0070047 A1 | 3/2016 | Okuyama et al. | |
| 2016/0154260 A1* | 6/2016 | Chen | G02F 1/1337 349/42 |
| 2018/0217420 A1* | 8/2018 | Cheng | G02F 1/137 |

FOREIGN PATENT DOCUMENTS

| | | |
|---|---|---|
| JP | 5467389 | 4/2014 |
| JP | 2016-057338 | 4/2016 |

\* cited by examiner

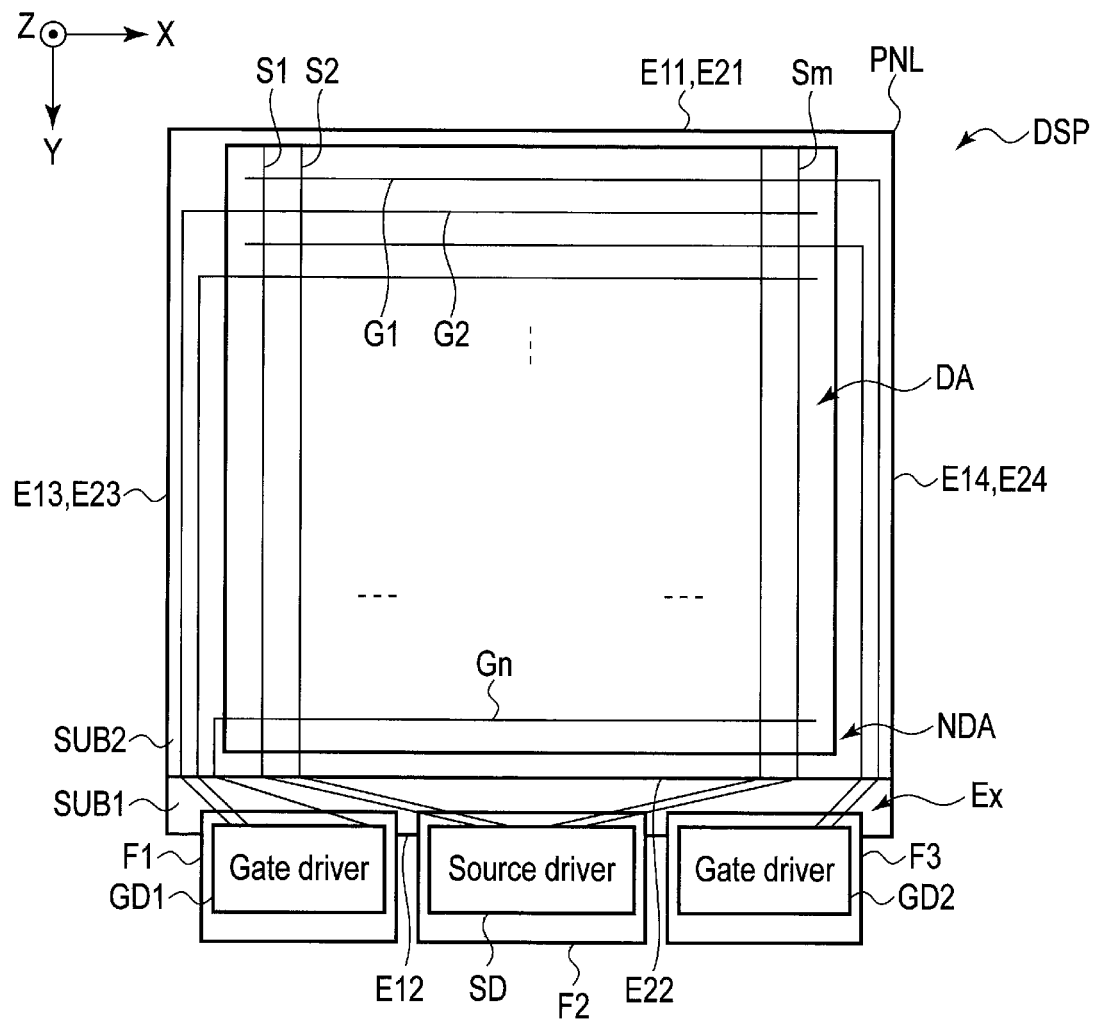
F I G. 1

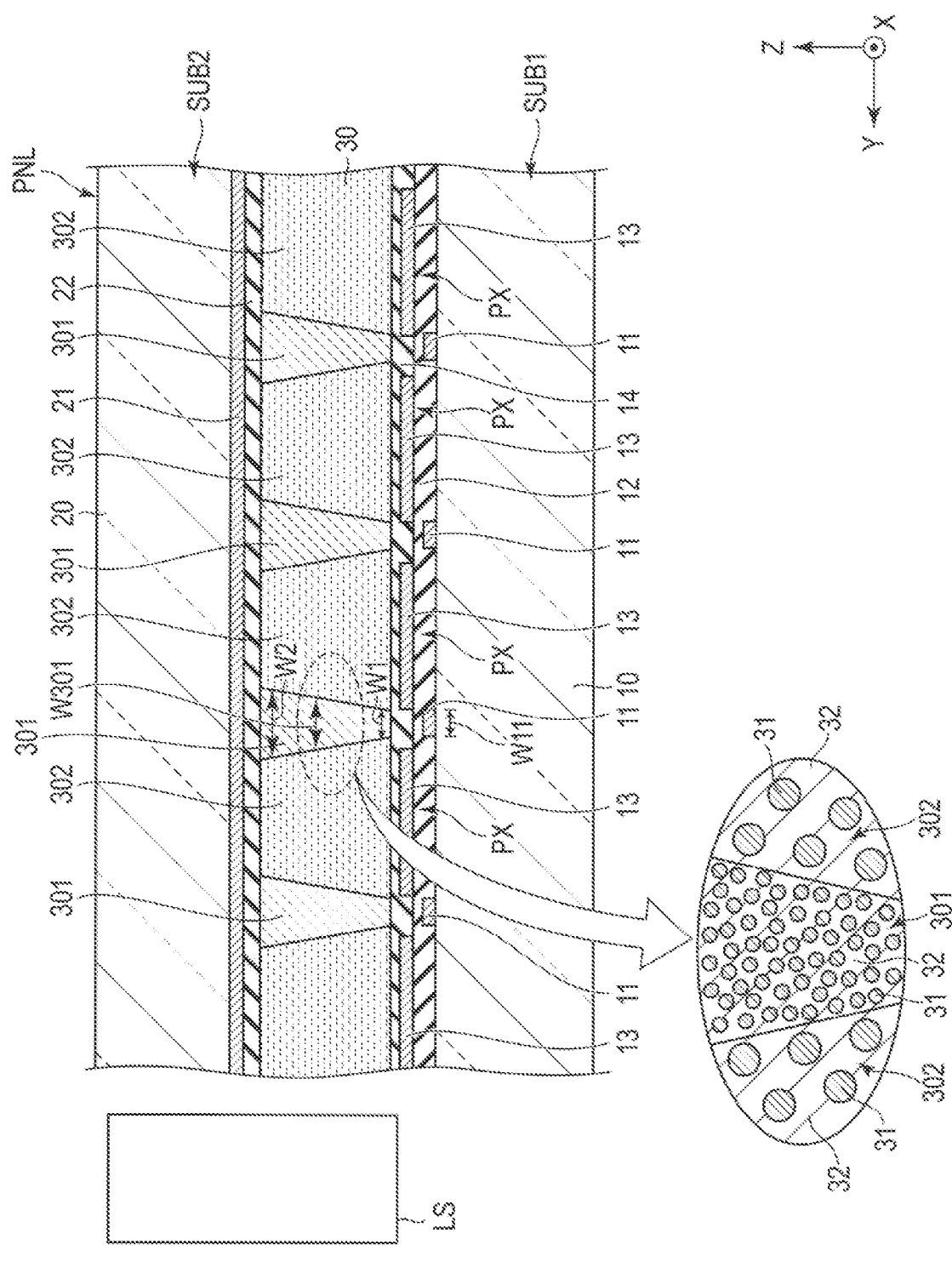
F I G. 3

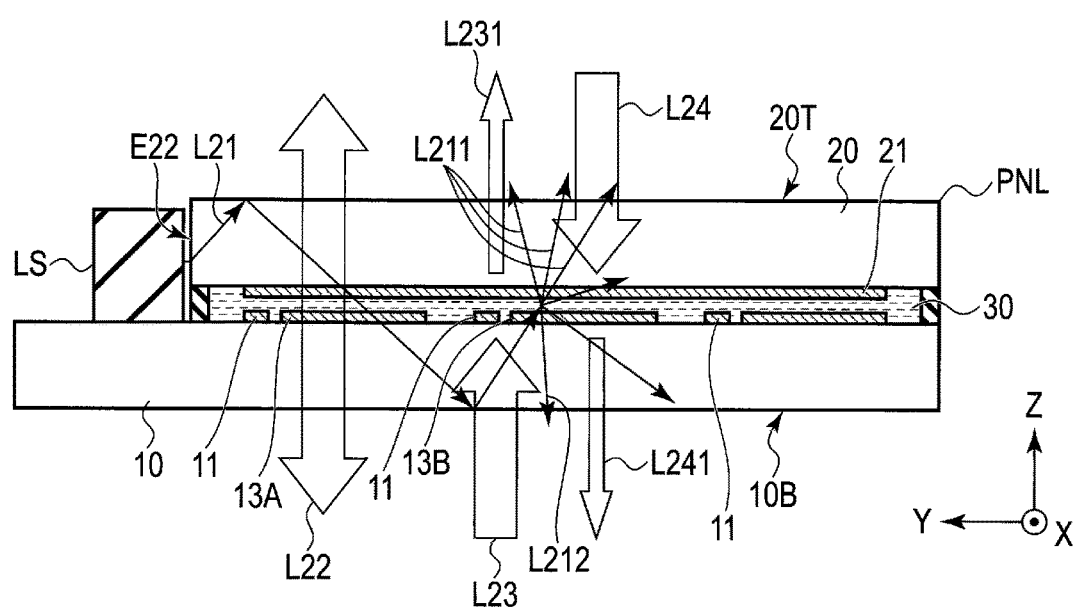
F I G. 8

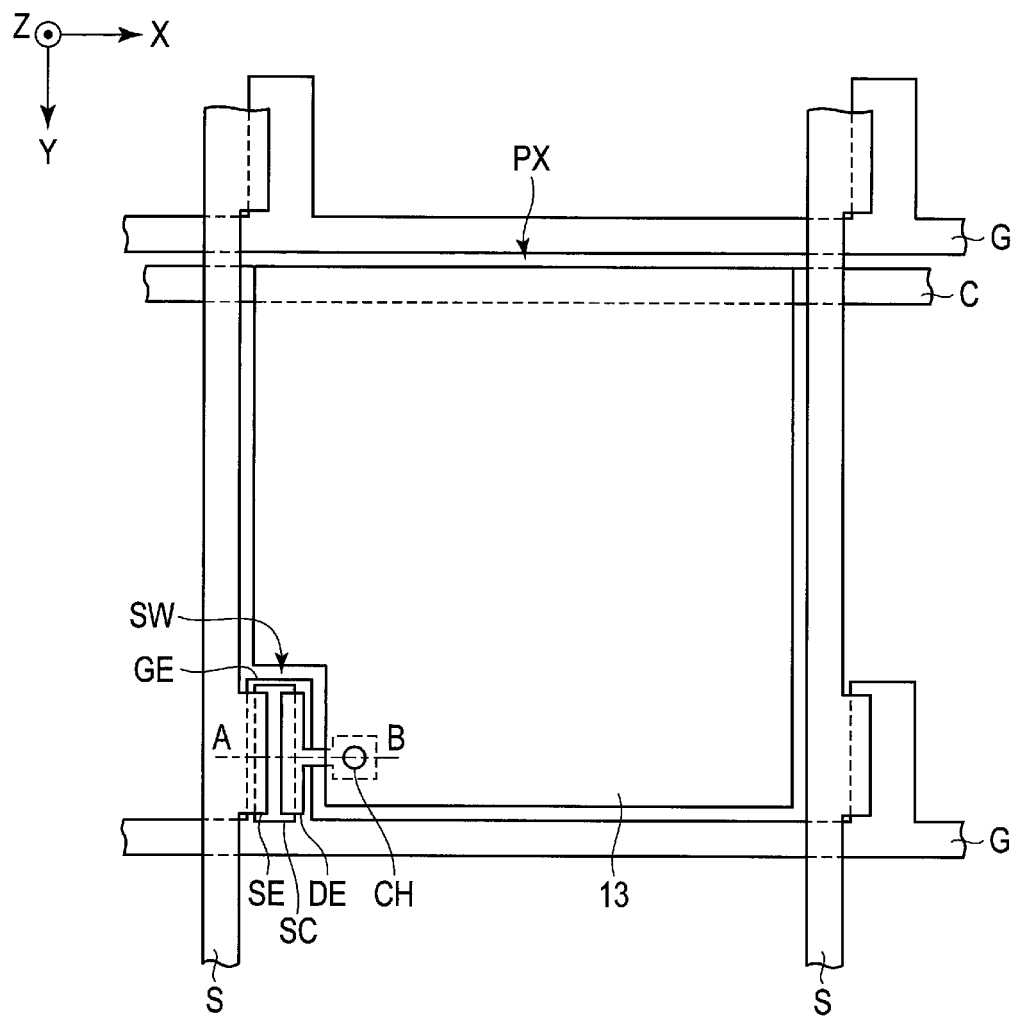
F I G. 9

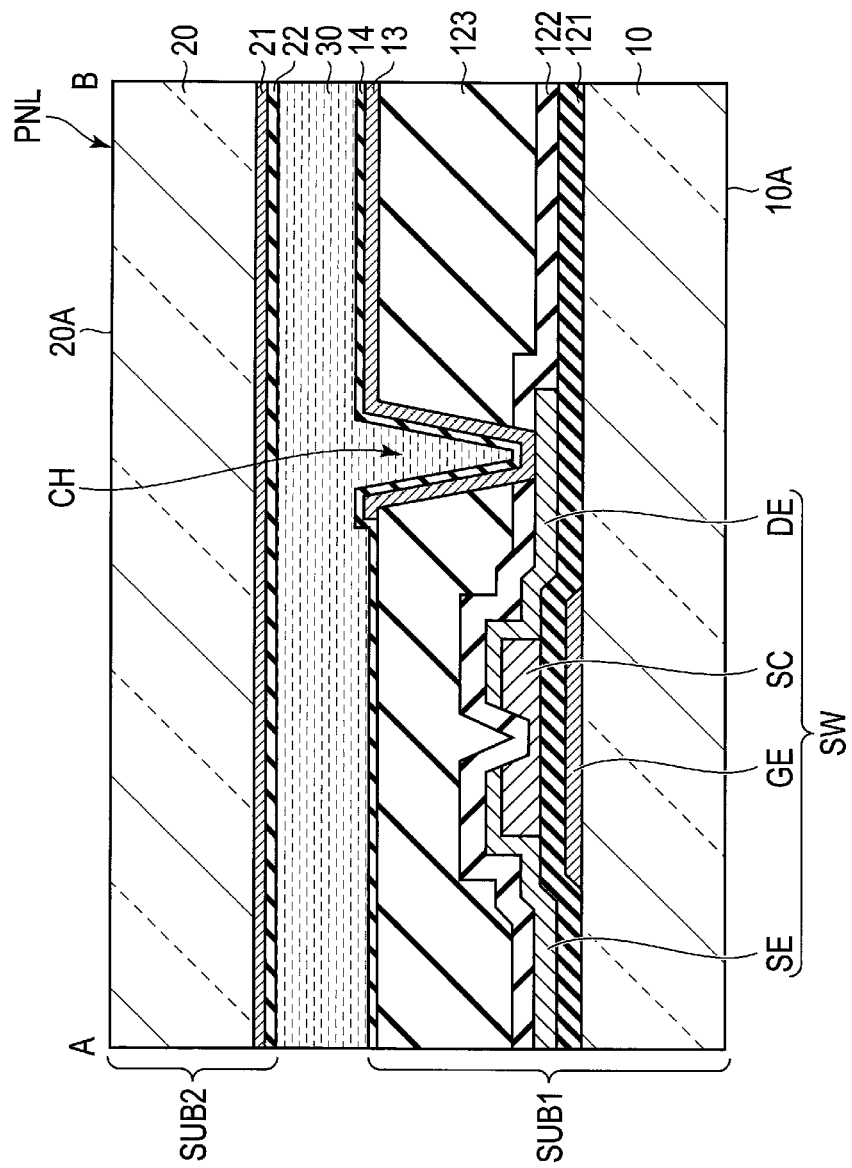
F I G. 10

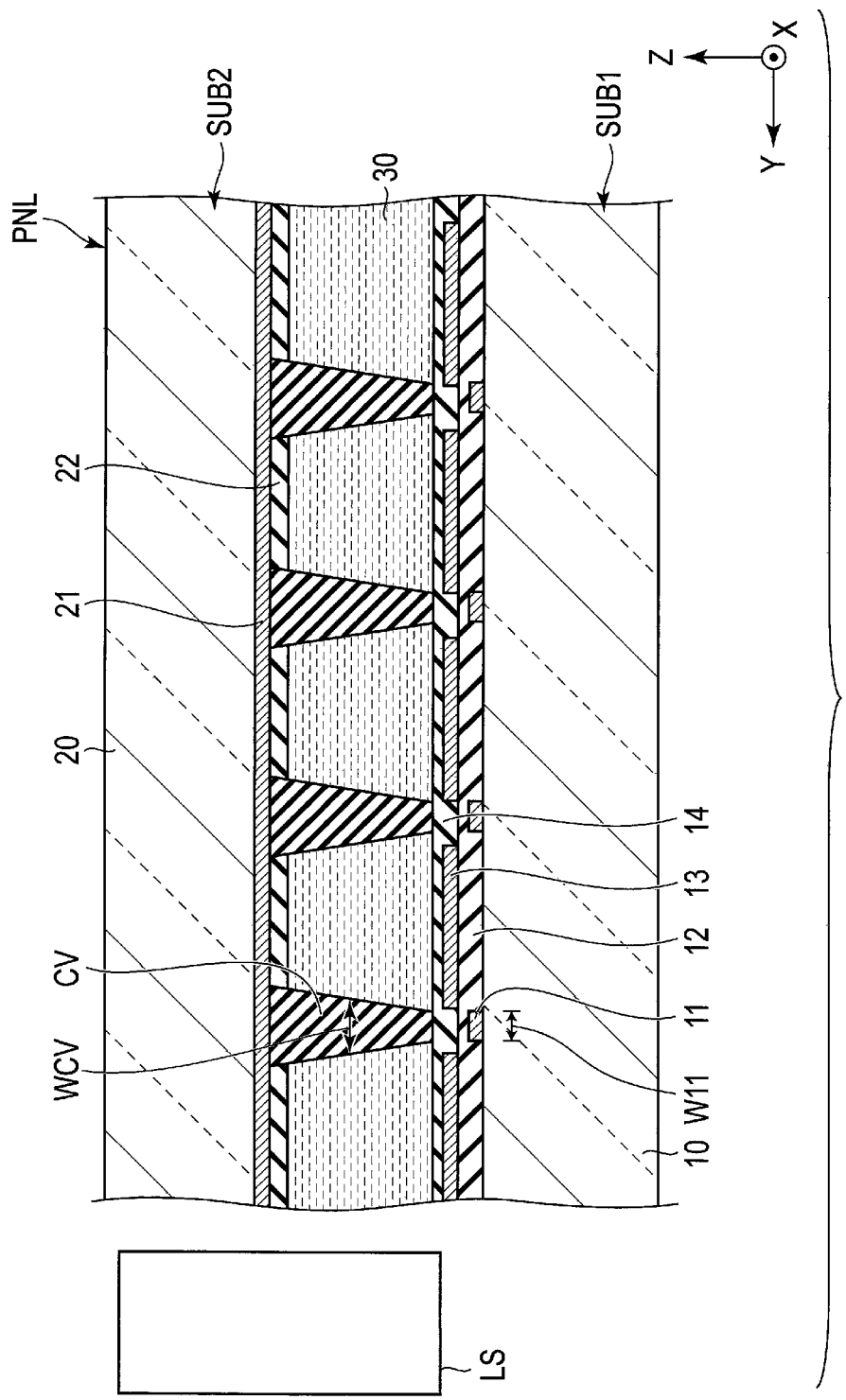
F I G. 16

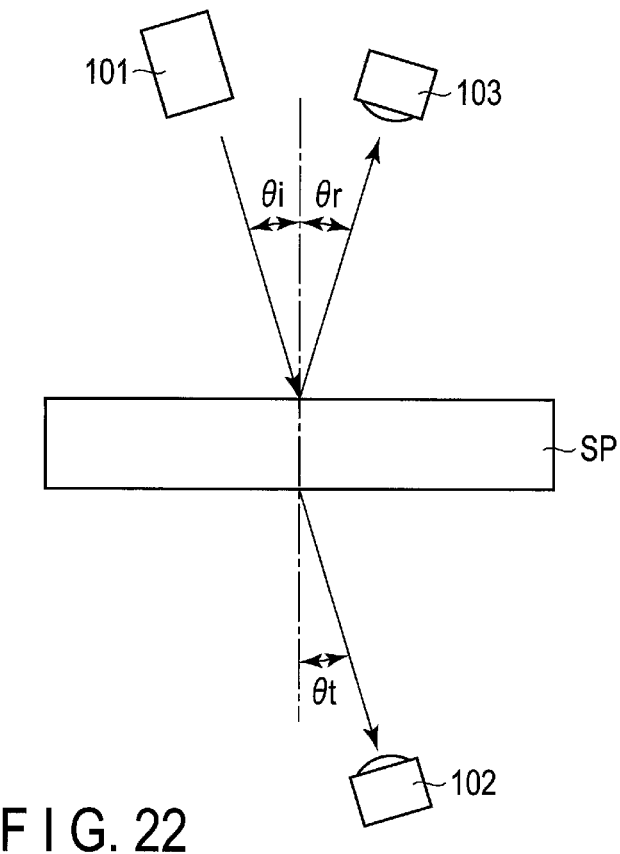
F I G. 22
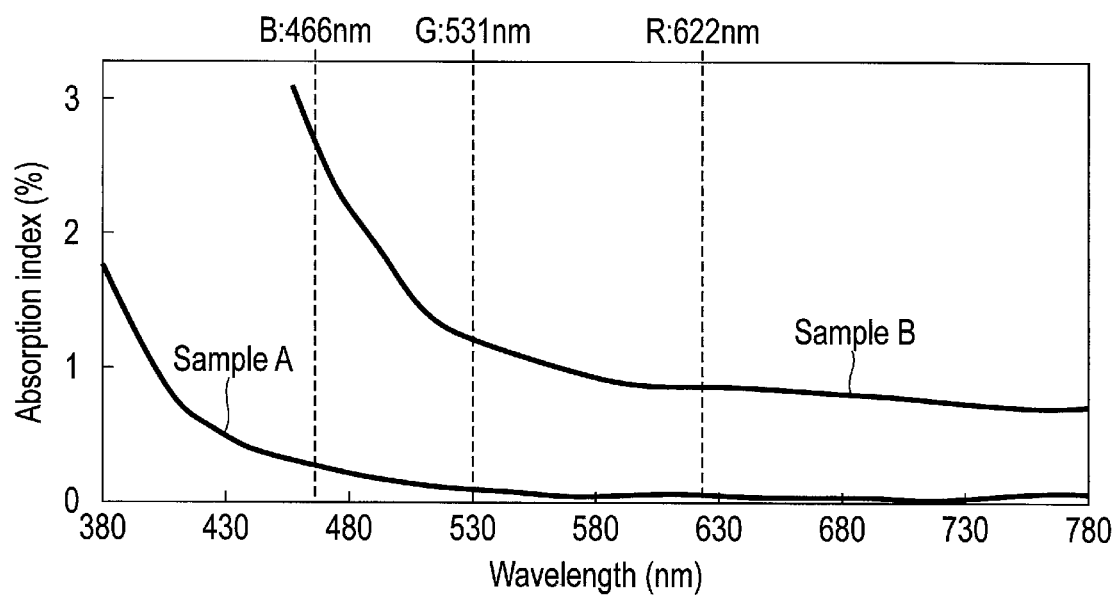
F I G. 23

DISPLAY DEVICE

CROSS-REFERENCE TO RELATED APPLICATIONS

This application is based upon and claims the benefit of priority from Japanese Patent Application No. 2017-129799, filed Jun. 30, 2017, the entire contents of which are incorporated herein by reference.

FIELD

Embodiments described herein relate generally to a display device.

BACKGROUND

Recently, various types of illumination devices using polymer dispersed liquid crystal (hereinafter called "PDLC") capable of switching a diffusing state of diffusing incident light and a transmitting state of transmitting incident light have been proposed.

In contrast, a display device using PDLC has been required to suppress degradation in display quality.

BRIEF DESCRIPTION OF THE DRAWINGS

FIG. 1 is a plan view showing a configuration example of a display device DSP according to the embodiments.

FIG. 3 is a cross-sectional view showing a first configuration example of the display panel PNL shown in FIG. 2.

FIG. 8 is a cross-sectional view showing the display panel PNL in a case where the liquid crystal layer 30 is in a scattering state.

FIG. 9 is a plan view showing a configuration example of a pixel PX.

FIG. 10 is a cross-sectional view seen along line A-B in the pixel PX shown in FIG. 9.

FIG. 16 is a cross-sectional view showing a third configuration example of the display panel PNL shown in FIG. 2.

FIG. 22 is an illustration for explanation of a method of measuring an absorption index of a sample.

FIG. 23 is a graph showing measurement results of an absorption index of a material forming the protrusion CV.

DETAILED DESCRIPTION

Figure 2:
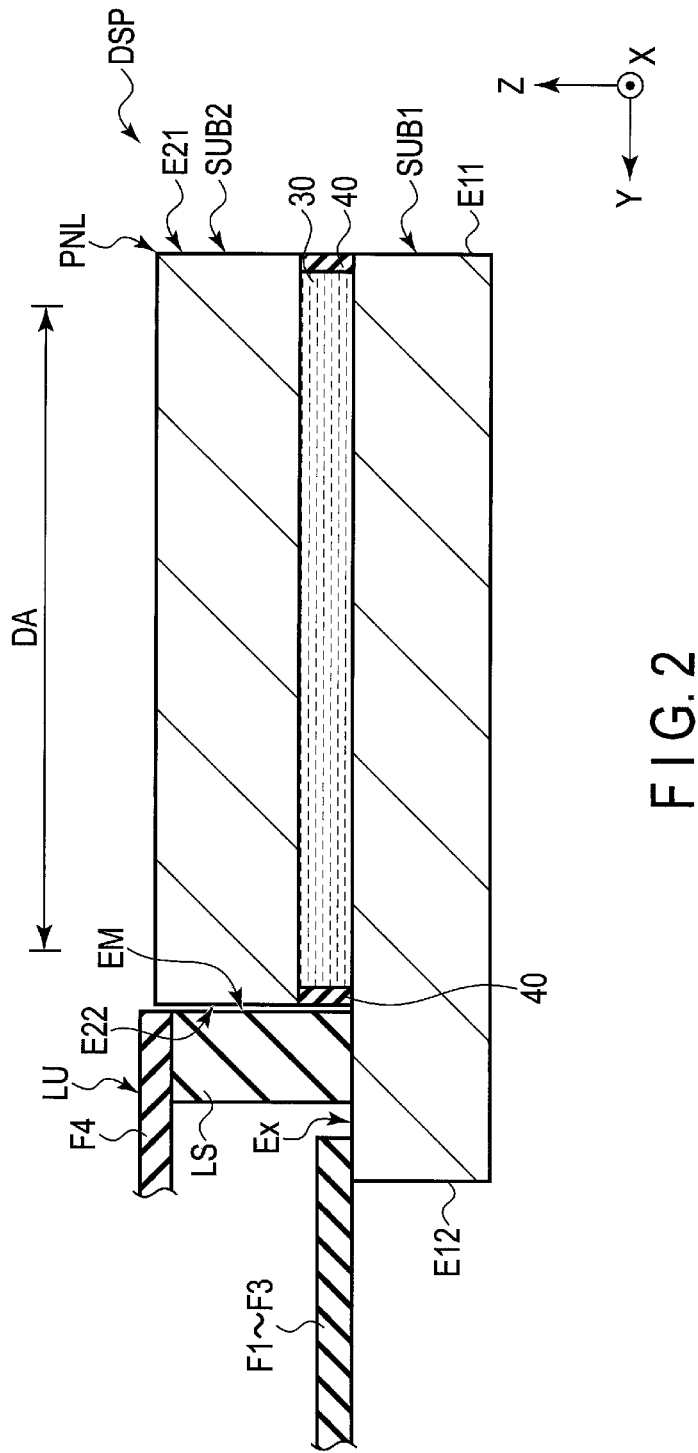
FIG. 2 is a cross-sectional view showing the display device DSP shown in FIG. 1.

In general, according to one embodiment, a display device includes a first substrate including a scanning line and a pixel electrode, a second substrate opposed to the first substrate, and a liquid crystal layer held between the first substrate and the second substrate and including streaky polymers and liquid crystal molecules, wherein the liquid crystal layer includes a first area overlapping the scanning line and a second area overlapping the pixel electrode, and the polymers of the first area are denser than the polymers of the second area.

According to another embodiment, a display device includes a first substrate including a high-voltage line, a low-voltage line intersecting the high-voltage line, and a pixel electrode, a second substrate opposed to the first substrate, and a liquid crystal layer held between the first substrate and the second substrate and including streaky polymers and liquid crystal molecules, wherein the liquid crystal layer includes a first area overlapping the high-voltage line and a second area overlapping the pixel electrode, a threshold voltage of the first area is higher than a potential difference formed on the high-voltage line.

According to yet another embodiment, a method of manufacturing a display device includes a first exposure step of disposing a liquid crystal material obtained by dispersing liquid crystal molecules in a liquid crystal monomer, between a first substrate comprising scanning lines and a second substrate, and exposing the liquid crystal material to ultraviolet light of a first illumination via a light-shield portion overlapping the scanning lines; and a second exposure step of exposing the liquid crystal material to ultraviolet light of a second illumination higher than the first illumination.

According to yet another embodiment, a display device includes a first substrate comprising a scanning line and a pixel electrode; a second substrate opposed to the first substrate; a liquid crystal layer held between the first substrate and the second substrate and including streaky polymers and liquid crystal molecules; and a protrusion located between the first substrate and the second substrate, overlapping the scanning line, extending in an extending direction of the scanning line, and formed of a transparent resin material.

Embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape and the like of each portion as compared with actual embodiments, but they are mere examples and do not restrict the interpretation of the invention. Furthermore, in the description and figures of the present application, structural elements having the same or similar functions will be referred to by the same reference numbers and detailed explanations of them that are considered redundant may be omitted.

FIG. 1 is a plan view showing a configuration example of a display device DSP according to the embodiments. In the drawing, a first direction X and a second direction Y intersect each other, and a third direction Z intersects the first direction X and the second direction Y. For example, the first direction X, the second direction Y, and the third direction Z are orthogonal to each other but may intersect at an angle other than ninety degrees. In the present specification, a position represented by a pointing end side of an arrow indicating the third direction Z will be referred to as "above", and a position represented by a rear end side of the arrow will be referred to as "below". When such expressions as "a second member above a first member" and "a second member below a first member" are used, the second member may be in contact with the first member or may be separated from the first member. In addition, an observation position at which the display device DSP is observed is assumed to be located on the pointing end side of the arrow indicating the third direction Z, and viewing from the observation position toward the X-Y plane defined by the first direction X and the second direction Y is called a planar view.

In the embodiments, a display device employing polymer dispersed liquid crystal will be explained as an example of the display device. The display device DSP comprises a display panel PNL, a wiring substrates F1 to F3, and a light source unit (not shown).

The display panel PNL includes a first substrate SUB1 and a second substrate SUB2. The first substrate SUB1 and the second substrate SUB2 overlap in planar view. The display panel PNL includes a display area DA on which an image is displayed and a frame-shaped non-display area NDA surrounding the display area DA. The display area DA is located in an area where the first substrate SUB1 and the second substrate SUB2 overlap. The display panel PNL includes n scanning lines G (G1 to Gn) and m signal lines S (S1 to Sm), in the display area DA. Each of n and m is a positive integer, and n may be equal to or different from m. The scanning lines G extend in the first direction X and are arranged at intervals in the second direction Y. The signal lines S extend in the second direction Y and are arranged at intervals in the first direction X.

The first substrate SUB1 includes end portions E11 and E12 extending in the first direction X, and end portions E13 and E14 extending in the second direction Y. The second substrate SUB2 includes end portions E21 and E22 extending in the first direction X, and end portions E23 and E24 extending in the second direction Y. In the example illustrated, the end portions E11 and E21, the end portions E13 and E23, and the end portions E14 and E24 overlap in planar view, but may not overlap. The end portion E22 is located between the end portion E12 and the display area DA in planar view. The first substrate SUB1 includes an extension portion Ex between the end portions E12 and E22.

The wiring substrates F1 to F3 are connected to the extension portion Ex and arranged in this order in the first direction X. The wiring substrate F1 is provided with a gate driver GD1. The wiring substrate F2 is provided with a source driver SD. The wiring substrate F3 is provided with a gate driver GD2. The wiring substrates F1 to F3 may be replaced with a single wiring substrate.

The signal lines S are drawn to the non-display area NDA and connected to the source driver SD. The scanning lines G are drawn to the non-display area NDA and connected to the gate drivers GD1 and GD2. In the example illustrated, odd-numbered scanning lines G are drawn between the end portion E14 and the display area DA and connected to the gate driver GD2. In addition, even-numbered scanning lines G are drawn between the end portion E13 and the display area DA and connected to the gate driver GD1. The relationship in connection between the gate drivers GD1 and GD2 and the scanning lines G is not limited to the example illustrated.

FIG. 2 is a cross-sectional view showing the display device DSP shown in FIG. 1. Main portions alone in the cross-section of the display device DSP in a Y-Z plane defined by the second direction Y and the third direction Z will be explained here. The display panel PNL comprises a liquid crystal layer 30 held between the first substrate SUB1 and the second substrate SUB2. The first substrate SUB1 and the second substrate SUB2 are bonded to each other by a sealant 40.

A light source unit LU comprises a light-emitting element LS serving as the light source, a wiring substrate F4, and the like. The light-emitting element LS is connected to the wiring substrate F4. In the example illustrated, the light-emitting element LS is located above the extension portion Ex. In addition, the light-emitting element LS is located between the wiring substrate F1 to F3 and the second substrate SUB2 in the second direction Y. The light-emitting element LS comprises a light emitting portion EM opposed to the end portion E22. The light-emitting element LS applies light from the light emitting portion EM to the end portion E22. The light incident from the end portion E22 propagates through the display panel PNL in the second direction Y as explained below. The light-emitting element LS may be opposed to the end portions of both the first substrate SUB1 and the second substrate SUB2, for example, the end portions E11 and E21.

FIG. 3 is a cross-sectional view showing a first configuration example of the display panel PNL shown in FIG. 2. The first substrate SUB1 comprises a transparent substrate 10, conductive lines 11, an insulating layer 12, pixel electrodes 13, an alignment film 14 and the like. The second substrate SUB2 comprises a transparent substrate 20, a common electrode 21, and an alignment film 22. The second substrate SUB2 does not comprise a light-shielding layer which overlaps the conductive lines 11. The transparent substrates 10 and 20 are insulating substrates such as glass substrates or plastic substrates. The conductive lines 11 are formed of an opaque metal material such as molybdenum, tungsten, aluminum, titanium or silver. The illustrated conductive lines 11 extend in the first direction X but may extend in the second direction Y. The insulating layer 12 is formed of a transparent insulating material. The pixel electrodes 13 and the common electrode 21 are formed of a transparent conductive material such as indium tin oxide (ITO) or indium zinc oxide (IZO). The pixel electrodes 13 are disposed in the respective pixels PX. The common electrode 21 is disposed across the pixels PX. The alignment films 14 and 22 may be horizontal alignment films having an alignment restriction force approximately parallel to the X-Y plane or may be vertical alignment films having an alignment restriction force approximately parallel to the third direction Z.

The liquid crystal layer 30 is located between the alignment films 14 and 22. The liquid crystal layer 30 contains polymer dispersed liquid crystal containing polymer 31 which is a polymeric compound and liquid crystal molecules 32. For example, the polymer 31 is liquid crystal polymer. The polymer 31 can be obtained by, for example, polymerizing liquid crystal monomer in a state of being aligned in a predetermined direction by the alignment restriction force of the alignment films 14 and 22. For example, the alignment treatment direction of the alignment films 14 and 22 agrees with the first direction X, and the alignment films 14 and 22 have the alignment restriction force in the first direction X. For this reason, the polymer 31 is formed in a streaky shape or a stripe shape extending in the first direction X. The liquid crystal molecules 32 are dispersed in gaps of the polymer 31 and aligned such that their major axis extends in the first direction X.

The polymer 31 and the liquid crystal molecules 32 have optical anisotropy or refractive anisotropy. The liquid crystal molecules 32 may be positive liquid crystal molecules having a positive dielectric anisotropy or negative liquid crystal molecules having a negative dielectric anisotropy. The polymer 31 and the liquid crystal molecules 32 are different in response performance to the electric field. The response performance of the polymer 31 to the electric field is lower than the response performance of the liquid crystal molecules 32 to the electric field.

The liquid crystal layer 30 includes first areas 301 which overlap the conductive lines 11 and second areas 302 which overlap the pixel electrodes 13. In the example illustrated, a width W301 of the first area 301 in the second direction Y on the first substrate SUB1 side is smaller than that on the second substrate SUB2 side. The first area 301 has a first width W1 on the first substrate SUB1 side and a second width W2 on the second substrate SUB2 side, and the first width W1 is smaller than the second width W2. The width W301 may be constant in the third direction Z or the first width W1 may be larger than the second width W2. The width W301 is desirably larger than or equal to the width W11 of the conductive line 11 in the second direction Y. In the example illustrated, the first width W1 is larger than or equal to a width W11.

The first area 301 is different in configuration from the second area 302. When the area surrounded by a dotted line in FIG. 3 is enlarged schematically, the polymers 31 in the first area 301 are denser than the polymers 31 in the second area 302. The polymers 31 in the first area 301 are thinner than the polymers 31 in the second area 302. In other words, the thin polymers 31 are formed densely in the first area 301, and the liquid crystal molecules 32 exist in the gaps of the thin polymers 31. For this reason, behavior of the liquid crystal molecules 32 tends to be limited by the polymers 31 in the first area 301. In contrast, in the second area 302, the polymers 31 grown to be comparatively thick are arranged at greater gaps than the polymers 31 in the first area 301, and liquid crystal molecules 32 exist in the gaps of the thick polymers 31. For this reason, behavior of the liquid crystal molecules 32 tends to be hardly limited by the polymers 31 in the second area 302. Thus, when voltage is applied to the liquid crystal layer 30, the response performance of the first area 301 to the electric field of the liquid crystal molecules 32 is lower than the response performance of the second area 302 to the electric field of the liquid crystal molecules 32. A threshold voltage of the first area 301 is higher than a threshold voltage of the second area 302, as explained later in detail. In the enlarged portion in the figure, the polymers 31 are represented by right-upward-sloping hatch lines, and the liquid crystal molecules 32 are represented by right-downward-sloping hatch lines. The polymers 31 of the first area 301 and the polymers 31 of the second area 302 are formed of the same liquid crystal monomer.

Figure 4:
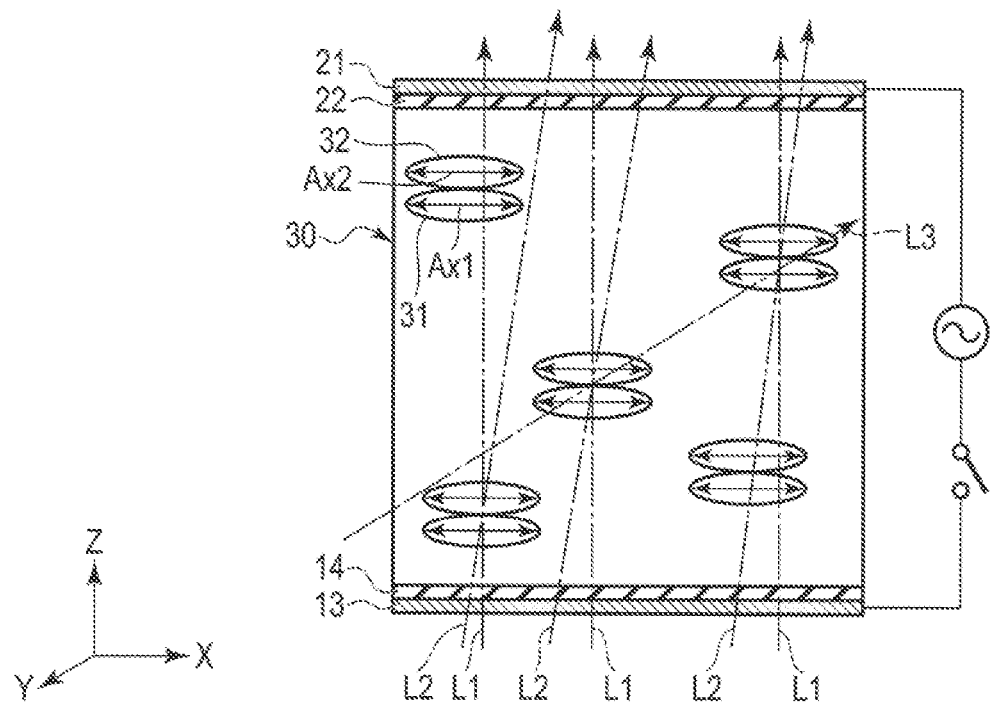
FIG. 4 is an illustration schematically showing liquid crystal layer 30 in a transparent state.

FIG. 4 is an illustration schematically showing liquid crystal layer 30 in a transparent state. The illustrated example corresponds to a state in which no voltage is applied to the liquid crystal layer 30 (for example, a state in which a potential difference between the pixel electrode 13 and the common electrode 21 is approximately zero). An optical axis Ax1 of the polymers 31 and an optical axis Ax2 of the liquid crystal molecules 32 are parallel to each other. In the example illustrated, each of the optical axis Ax1 and the optical axis Ax2 is parallel to the first direction X. The polymers 31 and the liquid crystal molecules 32 have approximately equivalent refractive anisotropy. In other words, ordinary refractive indexes of the polymers 31 and the liquid crystal molecules 32 are approximately equivalent to each other, and extraordinary refractive indexes of the polymers 31 and the liquid crystal molecules 32 are approximately equivalent to each other. For this reason, refractive index difference is hardly present between the polymers 31 and the liquid crystal molecules 32 in all directions including the first direction X, the second direction Y, and the third direction Z. A Light beam L1 incident on the liquid crystal layer 30 in the third direction Z is transmitted while hardly scattered in the liquid crystal layer 30. A light beam L2 incident in a direction oblique with respect to the third direction Z is hardly scattered in the liquid crystal layer 30. For this reason, high transparency can be obtained. The state illustrated in FIG. 4 is called a transparent state. For example, the light beam L3 corresponds to the light emitted from the light-emitting element LS shown in FIG. 3, and propagates in a direction opposite to the direction represented by an arrow of the second direction Y while hardly scattered in the liquid crystal layer 30.

Figure 5:
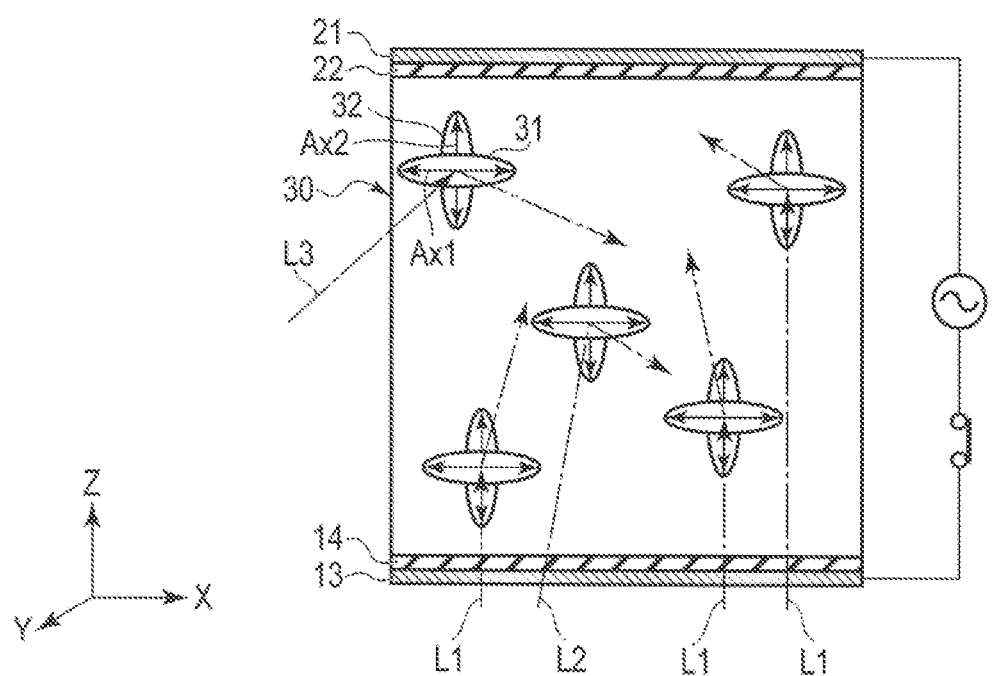
FIG. 5 is an illustration schematically showing the liquid crystal layer 30 in a scattering state.

FIG. 5 is an illustration schematically showing the liquid crystal layer 30 in a scattering state. The illustrated example corresponds to a state in which a voltage is applied to the liquid crystal layer 30 (for example, a state in which a potential difference between the pixel electrode 13 and the common electrode 21 is larger than or equal to a threshold value). As explained above, the response performance of the polymer 31 to the electric field is lower than the response performance of the liquid crystal molecules 32 to the electric field. For example, the alignment direction of the polymers 31 is hardly varied irrespective of the presence or absence of the electric field. In contrast, the alignment direction of the liquid crystal molecules 32 is varied in accordance with the electric field in a state in which a voltage higher than or equal to the threshold value is applied to the liquid crystal layer 30. In other words, as illustrated in the drawing, the optical axis Ax1 is substantially parallel to the first direction X while the optical axis Ax2 is oblique to the first direction X. If the liquid crystal molecules 32 are positive liquid crystal molecules, the liquid crystal molecules 32 are aligned such that their major axes correspond to the electric field. An electric field between the pixel electrode 13 and the common electrode 21 is formed in the third direction Z. For this reason, the liquid crystal molecules 32 are aligned such that their major axes or the optical axes Ax2 correspond to the third direction Z. In other words, the optical axes Ax1 and optical axes Ax2 intersect each other. A large refractive index difference is therefore generated between the polymers 31 and the liquid crystal molecules 32 in all directions including the first direction X, the second direction Y, and the third direction Z. The light beams L1 to L3 incident on the liquid crystal layer 30 are thereby scattered in the liquid crystal layer 30. The state illustrated in FIG. 5 is called a scattering state.

Figure 6:
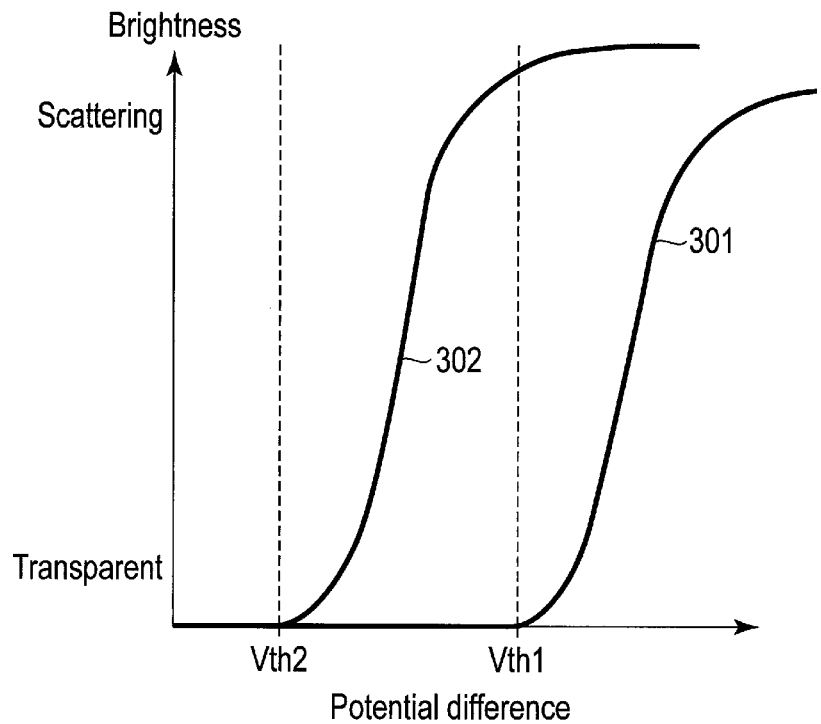
FIG. 6 is a graph showing the scattering characteristic of the liquid crystal layer 30.

FIG. 6 is a graph showing the scattering characteristic of the liquid crystal layer 30. In the graph, the horizontal axis represents a potential difference and the vertical axis represents brightness. The brightness corresponds to luminance of the scattered light obtained when the light is scatted on the liquid crystal layer 30. The brightness represents a scattering degree of the liquid crystal layer 30 from the other viewpoint. As shown in the graph, the first area 301 is different from the second area 302 with respect to the threshold voltage varied from the transparent state to the scattering state. In the graph of the first area 301, the potential difference corresponds to a potential difference between the conductive lines 11 and the common electrode 21. In the graph of the second area 302, the potential difference corresponds to a potential difference between the pixel electrodes 13 and the common electrode 21. As shown in the graph, a threshold voltage Vth1 of the first area 301 is higher than a threshold voltage Vth2 of the second area 302.

The degree of scattering in the first area 301 is, desirably, approximately zero in the range of the potential difference between the conductive lines 11 and the common electrode 21. For example, the threshold voltage Vth1 is in a range of, for example, approximately 15 to 25V. The conductive lines 11 are often high-voltage lines to which a high voltage is supplied. For example, if the conductive lines 11 are the scanning lines G, the potential difference of approximately 20V at the maximum is formed between the conductive lines 11 and the common electrode 21. For this reason, if the conductive lines 11 are high-voltage lines, the threshold voltage Vth1 is higher than the potential difference formed on the conductive lines 11, for example, higher than 20V.

In the scanning lines G and the signal lines S intersecting each other, the voltage supplied to the scanning lines G is higher than the voltage supplied to the signal lines S. For this reason, the scanning lines G are often called high-voltage lines as explained above, and the signal lines S are often called low-voltage lines.

The degree of scattering in the second area 302 is, desirably, saturated in the range of the potential difference between the pixel electrodes 13 and the common electrode 21. For example, the threshold voltage Vth2 is in a range of, for example, approximately 5 to 10V. The first area 301 is maintained in the transparent state even if a voltage approximately equivalent to the threshold voltage Vth2 or a voltage enough to saturate the degree of scattering of the second area 302 is applied to the first area 301.

Figure 7:
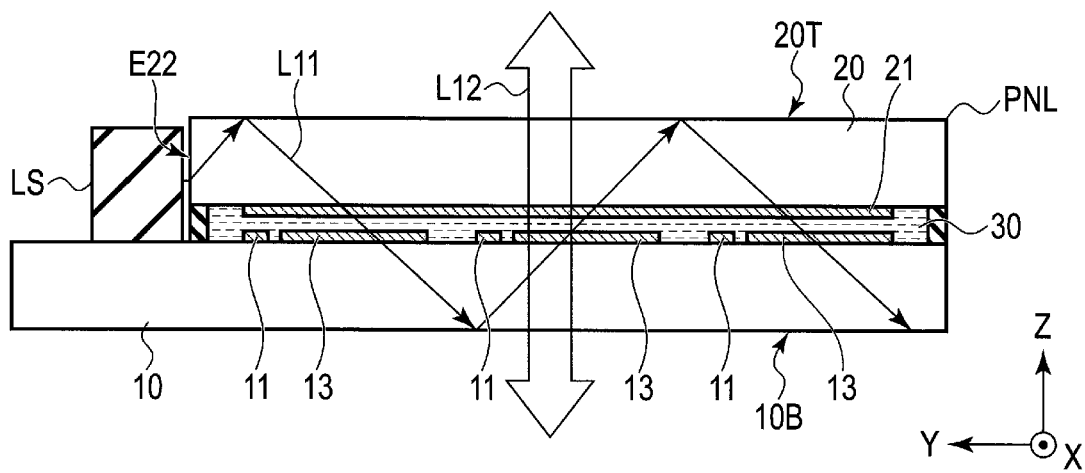
FIG. 7 is a cross-sectional view showing the display panel PNL in a case where the liquid crystal layer 30 is in a transparent state.

FIG. 7 is a cross-sectional view showing the display panel PNL in a case where the liquid crystal layer 30 is in a transparent state. A light beam L11 emitted from the light-emitting element LS is made incident on the display panel PNL from the end portion E22 to propagate through the transparent substrate 20, the liquid crystal layer 30, the transparent substrate 10, and the like. The liquid crystal layer 30 overlapping the conductive lines 11 and the pixel electrodes 13 are the transparent state. For this reason, the light beam L11 is hardly scattered in the liquid crystal layer 30, and hardly leaks from a lower surface 10B of the transparent substrate 10 or an upper surface 20T of the transparent substrate 20.

An external light beam L12 incident on the display panel PNL is transmitted and hardly scattered in the liquid crystal layer 30. In other words, the external light beam L12 incident on the display panel PNL from the lower surface 10B is transmitted through the upper surface 20T, and the external light beam L12 incident on the display panel PNL from the upper surface 20T is transmitted through the lower surface 10B. For this reason, the user can visually recognize a background on the lower surface 10B side through the display panel PNL when observing the display panel PNL from the upper surface 20T side. Similarly, the user can visually recognize a background on the upper surface 20T side through the display panel PNL when observing the display panel PNL from the lower surface 10B side.

FIG. 8 is a cross-sectional view showing the display panel PNL in a case where the liquid crystal layer 30 is in a scattering state. A light beam L21 emitted from the light-emitting element LS is made incident on the display panel PNL from the end portion E22 to propagate through the transparent substrate 20, the liquid crystal layer 30, the transparent substrate 10, and the like. In the example illustrated, the liquid crystal layer 30 overlapping the conductive lines 11 are maintained in the transparent state. In addition, the liquid crystal layer 30 overlapping a pixel electrode 13A is in the transparent state. For this reason, the light beam L21 is hardly scattered in an area which overlaps the conductive line 11 and a pixel electrode 13A in the liquid crystal layer 30. In contrast, the liquid crystal layer 30 overlapping a pixel electrode 13B is in the scattering state. For this reason, the light beam L21 is scattered in an area which overlaps the pixel electrode 13B in the liquid crystal layer 30. A scattered light beam L211 which is a part of the light beam L21 is transmitted through the upper surface 20T, a scattered light beam L212 which is another part of the light beam L21 is transmitted through the lower surface 10B, and the other scatter light beam propagates through the inside of the display panel PNL.

In the area which overlaps the pixel electrode 13A, an external light beam L22 incident on the display panel PNL is transmitted and hardly scattered in the liquid crystal layer 30, similarly to the external light beam L12 shown in FIG. 7. In the area which overlaps the pixel electrode 13B, an external light beam L23 incident from the lower surface 10B is scattered in the liquid crystal layer 30 and a light beam L231 which is a part of the external light beam L23 is transmitted through the upper surface 20T. In addition, an external light beam L24 incident from the upper surface 20T is scattered in the liquid crystal layer 30 and a light beam L241 which is a part of the external light beam L24 is transmitted through the lower surface 10B. For this reason, the user can visually recognize a color of the light beam L21 in the area overlapping the pixel electrode 13B when observing the display panel PNL from the upper surface 20T side. In addition, since the external light beam L231 is transmitted through the display panel PNL, the user can also visually recognize the background on the lower surface 10B side through the display panel PNL. Similarly, the user can visually recognize a color of the light beam L21 in the area overlapping the pixel electrode 13B when observing the display panel PNL from the lower surface 10B side. In addition, since the external light beam L241 is transmitted through the display panel PNL, the user can also visually recognize the background on the upper surface 20T side through the display panel PNL. In the area overlapping the pixel electrode 13A, the color of the light beam L21 can hardly be recognized visually and the user can visually recognize the background through the display panel PNL since the liquid crystal layer 30 is in the transparent state.

According to the above first configuration example of the embodiments, the threshold voltage Vth1 of the first area 301 overlapping the conductive lines 11 is higher than the threshold voltage Vth2 of the second area 302 overlapping the pixel electrodes 13. For this reason, the first area 301 can be maintained in the transparent state even when a voltage higher than or equal to the voltage supplied to the pixel electrodes 13 is supplied to the conductive lines 11. In other words, undesired scattering can be suppressed in the area overlapping the conductive lines 11. Deterioration in display quality can be therefore suppressed. In addition, attenuation of the light from light-emitting element LS which results from undesired scattering can be suppressed and the efficiency of use of the light can be improved.

FIG. 9 is a plan view showing an example of the pixel PX. In the example illustrated, the pixel PX is sectioned by two signal lines S arranged in the first direction X and two scanning lines G arranged in the second direction Y. The pixel PX comprises the switching element SW and the pixel electrode 13. The switching element SW is, for example, a thin-film transistor, which is electrically connected to the scanning line G and the signal line S. More specifically, the switching element SW comprises a semiconductor layer SC, a gate electrode GE, a source electrode SE, and a drain electrode DE. The gate electrode GE is formed integrally with the scanning line G. In the example illustrated, the switching element SW is a bottom-gate type switching element in which a gate electrode GE is located below the semiconductor layer SC, but may be a top-gate type switching element in which a gate electrode GE is located above the semiconductor layer SC. The semiconductor layer SC is formed of, for example, amorphous silicon, but may be formed of polycrystalline silicon or an oxide semiconductor. The source electrode SE is formed integrally with the signal line S and is in contact with the semiconductor layer SC. The drain electrode DE is remote from the source electrode SE and is in contact with the semiconductor layer SC. The pixel electrode 13 overlaps the drain electrode DE and is in contact with the drain electrode DE through the contact hole CH.

In addition, a capacitive line C is disposed between two scanning lines G. The pixel electrode 13 overlaps the capacitive line C. A storage capacitance is formed at a portion where the capacitive line C and the pixel electrode 13 overlap.

FIG. 10 is a cross-sectional view showing the pixel PX seen along line A-B in FIG. 9. In the first substrate SUB1, the gate electrode GE and a scanning line G (not shown) are located on the transparent substrate 10 and correspond to, for example, the conductive lines 11 shown in FIG. 3. An insulating layer 121 covers the gate electrode GE and the transparent substrate 10. The semiconductor layer SC is located on the insulating layer 121 just above the gate electrode GE. Each of the source electrode SE and the drain electrode DE is located on the insulating layer 121 and is in contact with the semiconductor layer SC. An insulating layer 122 covers the semiconductor layer SC, the source electrode SE, the drain electrode DE, and the insulating layer 121. The insulating layer 123 covers the insulating layer 122. The insulating layers 121 to 123 correspond to, for example, the insulating layer 12 shown in FIG. 3. The insulating layers 121 and 122 are formed of a transparent inorganic insulating material such as silicon nitride or silicon oxide. The insulating layer 123 is formed of a transparent organic insulating material such as acrylic resin. The pixel electrode 13 is located on the insulating layer 123. The pixel electrode 13 is in contact with the drain electrode DE at the contact hole CH which penetrates the insulating layers 122 and 123. The alignment film 14 covers the pixel electrode 13 and the insulating layer 123.

The common electrode 21 is located under the transparent substrate 20, in the second substrate SUB2. The alignment film 22 covers the common electrode 21. The liquid crystal layer 30 is in contact with the alignment films 14 and 21.

Figure 11:
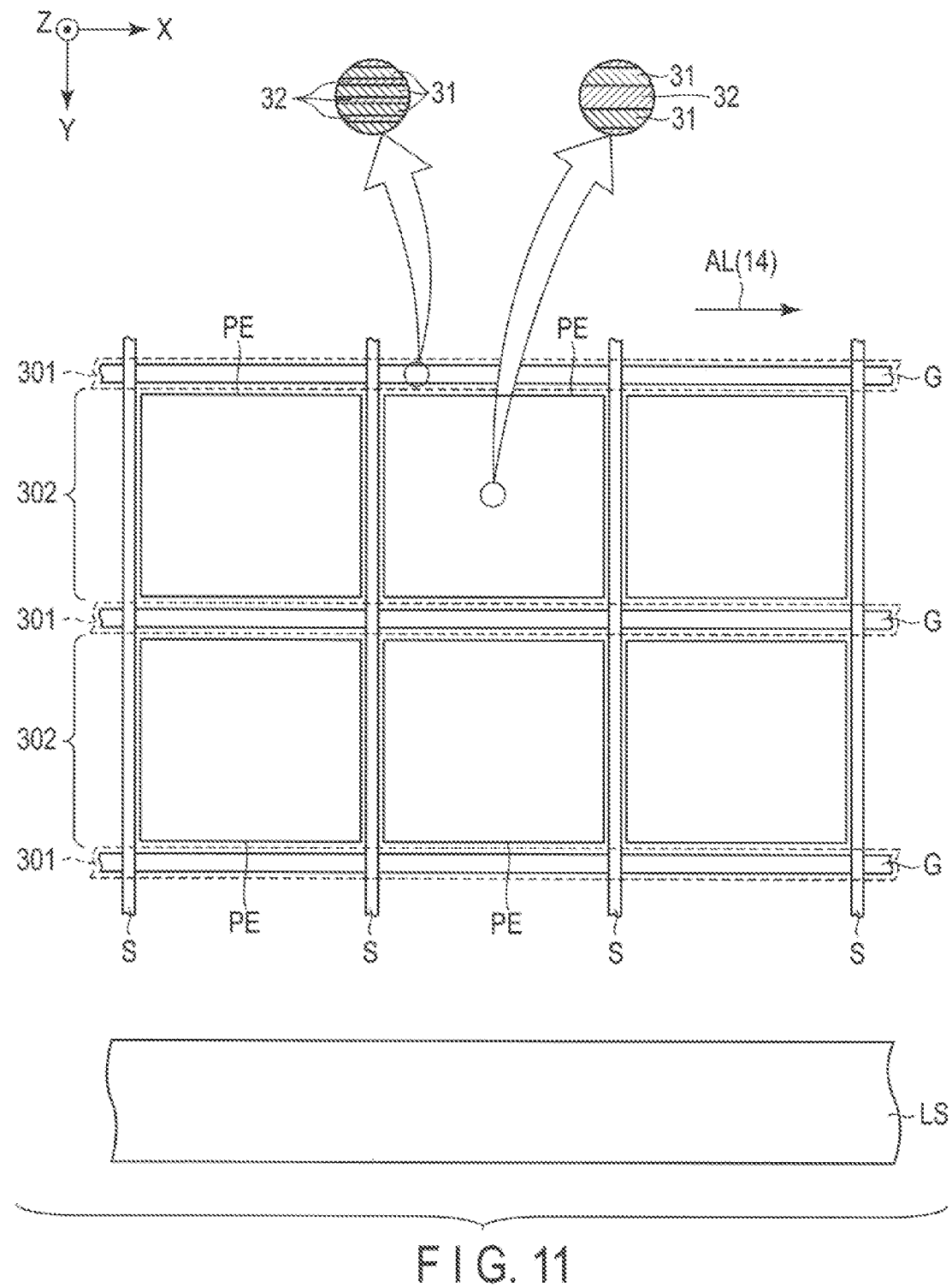
FIG. 11 is a plan view showing an example of a first area 301 and a second area 302.

FIG. 11 is a plan view showing an example of a first area 301 and a second area 302. The light emitted from the light-emitting element LS propagates in a direction opposite to the direction represented by an arrow of the second direction Y as explained above. The scanning lines G are conductive lines intersecting the direction of propagation of the light. The scanning lines G overlap the first areas 301 in planar view. Each of the scanning lines G and the first areas 301 extends in an alignment treatment direction AL of the alignment film 14 or the first direction X. In the example illustrated, the first areas 301 do not extend in the second direction Y. The second areas 302 intersect the signal lines S and extend in the first direction X, at positions between the adjacent scanning lines G. Alternatively, the second areas 302 overlap the pixel electrodes PE arranged in the first direction.

The alignment treatment direction AL is parallel to the first direction X. For this reason, the polymers 31 extend in the first direction X, in the first areas 301 and the second areas 302. As schematically shown in the figure, the polymers 31 in the first areas 301 are thinner and denser than the polymers 31 in the second areas 302. In addition, the liquid crystal molecules 32 exist between the adjacent polymers 31. According to the example illustrated, undesired scattering can be suppressed in the areas overlapping the scanning lines G.

Figure 12:
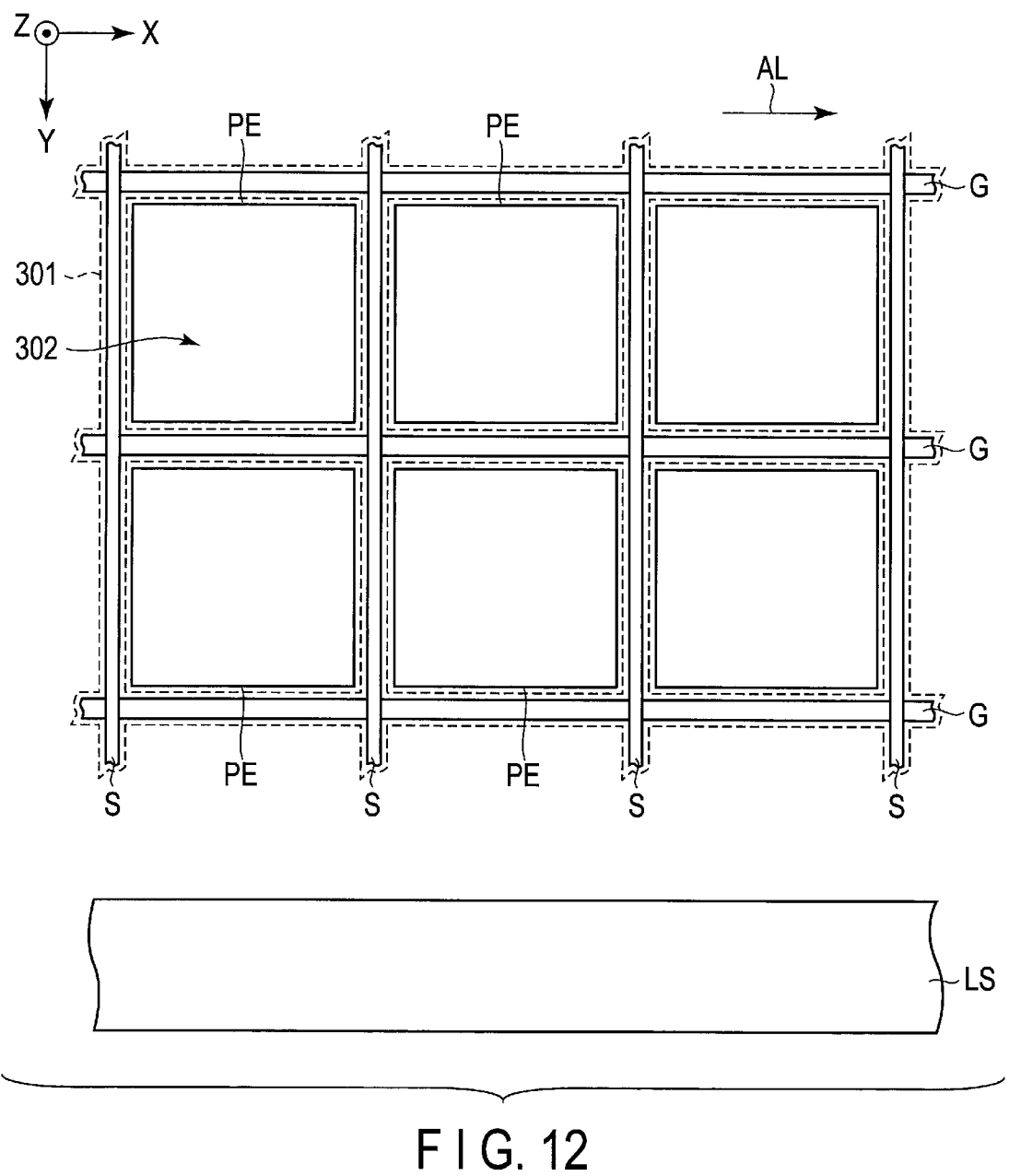
FIG. 12 is a plan view showing another example of the first area 301 and the second area 302.

FIG. 12 is a plan view showing another example of the first area 301 and the second area 302. The example shown in FIG. 12 is different from the example shown in FIG. 11 with respect to a feature that the first area 301 extends not only in the first direction X but also in the second direction Y. The scanning lines G extend in the first direction X and are arranged at intervals in the second direction Y. The signal lines S extend in the second direction Y and are arranged at intervals in the first direction X. The first area 301 overlaps the scanning lines G and the signal lines S in planar view. In other words, the first area 301 is formed in a grating shape. The second area 302 is located on the inner side surrounded by the first area 301. The second area 302 overlaps the pixel electrode PE. In addition, each of the second area 302 and the pixel electrode PE is located on the inner side surrounded by two scanning lines and two signal lines. According to the example illustrated, undesired scattering can also be suppressed in not only the areas overlapping the scanning lines G, but also the areas overlapping the signal lines S.

Figure 13:
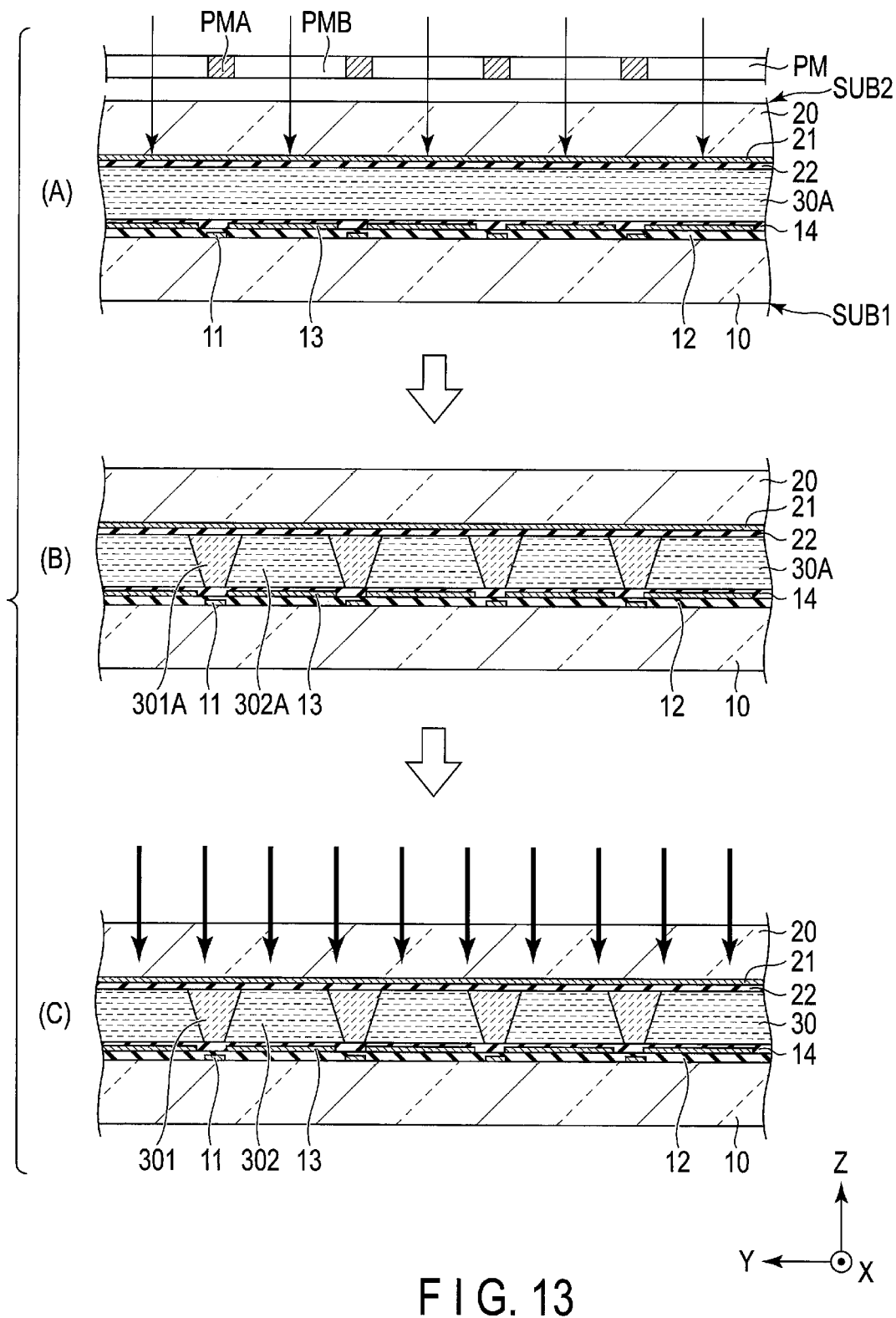
FIG. 13 is an illustration for explanation of a method of forming the liquid crystal layer 30 of the first configuration example.

FIG. 13 is an illustration for explanation of a method of forming the liquid crystal layer 30 of the first configuration example. As shown in FIG. 13(A), a liquid crystal material 30A obtained by dispersing the liquid crystal molecules in a liquid crystal monomer is prepared and the liquid crystal material 30A is disposed between the alignment films 14 and 21 subjected to alignment treatment. At this time, the liquid crystal molecules and the liquid crystal monomer are aligned in the first direction X by the alignment restriction force of the alignment films 14 and 22. A photomask PM is disposed on the transparent substrate 20. The photomask PM comprises shield portions PMA which overlap the conductive lines 11 to block ultraviolet light, and transmitting portions PMB which overlap the pixel electrodes 13 to allow ultraviolet light to be transmitted. Then, the liquid crystal material 30A is exposed to ultraviolet light through the photomask PM (first exposure step). At this time, the photomask PM blocks ultraviolet light in the areas overlapping the conductive lines 11, and allows ultraviolet light to be transmitted in the areas overlapping the pixel electrodes 13. In other words, in the liquid crystal material 30A, the areas overlapping the pixel electrodes 13 are exposed and the areas overlapping the conductive lines 11 are hardly exposed. As shown in FIG. 13(B), the liquid crystal material 30A is separated into unexposed areas 301A overlapping the conductive lines 11 and exposed areas 302A overlapping the pixel electrodes 13. In the exposed areas 302A, the liquid crystal monomers aligned in a predetermined direction by the alignment restriction force of the alignment films 14 and 21 are polymerized and the streaky polymers as explained above are formed. In the first exposure step, polymerization of the liquid crystal monomers is accelerated by applying ultraviolet light of a comparatively low illumination for a long time. In addition, since the concentration of the liquid crystal monomers is lowered as the polymerization of the liquid crystal monomers of the exposed areas 302A proceeds, the liquid crystal monomers contained in the unexposed areas 301A are diffused toward the exposed areas 302A. For this reason, more liquid crystal monomers are polymerized and polymers shaped in a thick streak are formed in the exposed areas 302A.

After that, as shown in FIG. 13(C), the entire surface of the liquid crystal material 30A is exposed to ultraviolet light, not through the photomask (second exposure step). The liquid crystal monomers are thereby polymerized on the entire area of the liquid crystal material 30A including the unexposed areas 301A and the polymer is formed. Second illumination of ultraviolet light applied in the second exposure step is higher than first illumination of ultraviolet light applied in the first exposure step. However, the first exposure time in the first exposure step is longer than the second exposure time in the second exposure step. Then, the first exposure amount in the first exposure step is equivalent to the second exposure amount in the second exposure step. In the second exposure step, the liquid crystal monomers are polymerized by applying ultraviolet light of a high illumination for a short time, but growth of the polymers is hardly accelerated. For this reason, a number of polymers shaped in a thin streak are formed. The unexposed areas 301A become the first areas 301, and the exposed areas 302A become the second areas 302. The polymers of the first areas 301 formed in these steps are denser than the polymers of the second areas 302, and the response performance of the first areas 301 to the electric field is lower than that of the second areas 302 as explained above.

In the first exposure step, ultraviolet light transmitted through the photomask PM tend to expand as ultraviolet light proceed downwardly. The transparent substrate 20 is desirably thin to form the first area 301 having the same width as the conductive line 11 with high accuracy, in the area overlapping the conductive line 11. In addition, ultraviolet light beam may be applied linearly along the conductive line 11, not through the photomask. If the first exposure amount is equivalent to the second exposure amount, the polymers shaped in a thick streak and the polymers shaped in a thin streak can be mechanically formed in the respective desired areas. If the first exposure amount is different from the second exposure amount, the polymers shaped in a thick streak and the polymers shaped in a thin streak can be formed in the respective areas.

Figure 14:
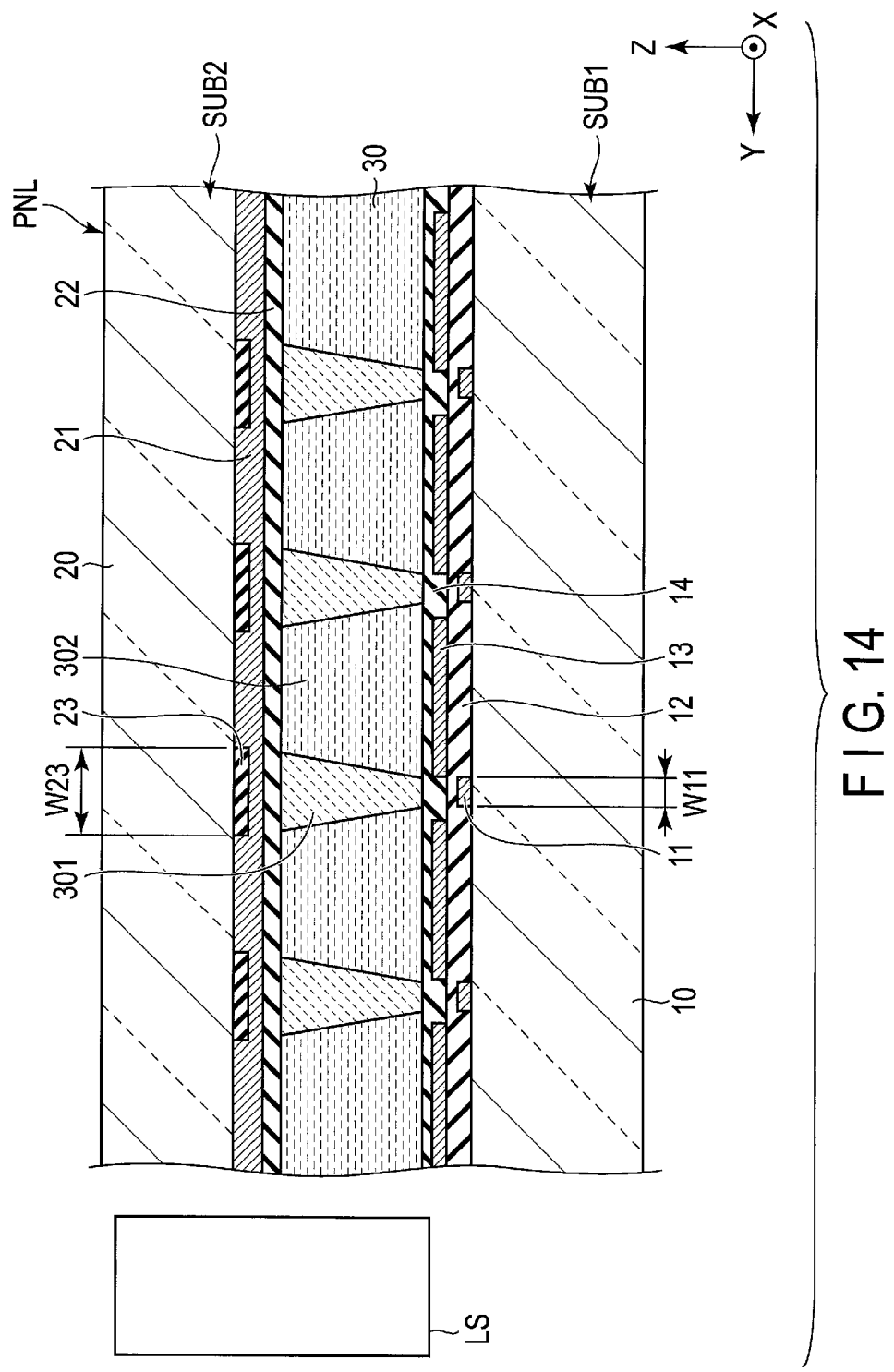
FIG. 14 is a cross-sectional view showing a second configuration example of the display panel PNL shown in FIG. 2.

FIG. 14 is a cross-sectional view showing a second configuration example of the display panel PNL shown in FIG. 2. The second configuration example is different from the first configuration example shown in FIG. 3 with respect to a feature of comprising light-shielding layers 23 at positions where the second substrate SUB2 overlaps the conductive lines 11. A width W23 of the light-shielding layer 23 in the second direction Y is larger than or equal to the width W11 of the conductive line 11. In the liquid crystal layer 30, the first area 301 is located between the conductive line 11 and the light-shielding layer 23. Details of the first areas 301 and the second areas 302 are not explained since they are the same as those in the first configuration example.

Figure 15:
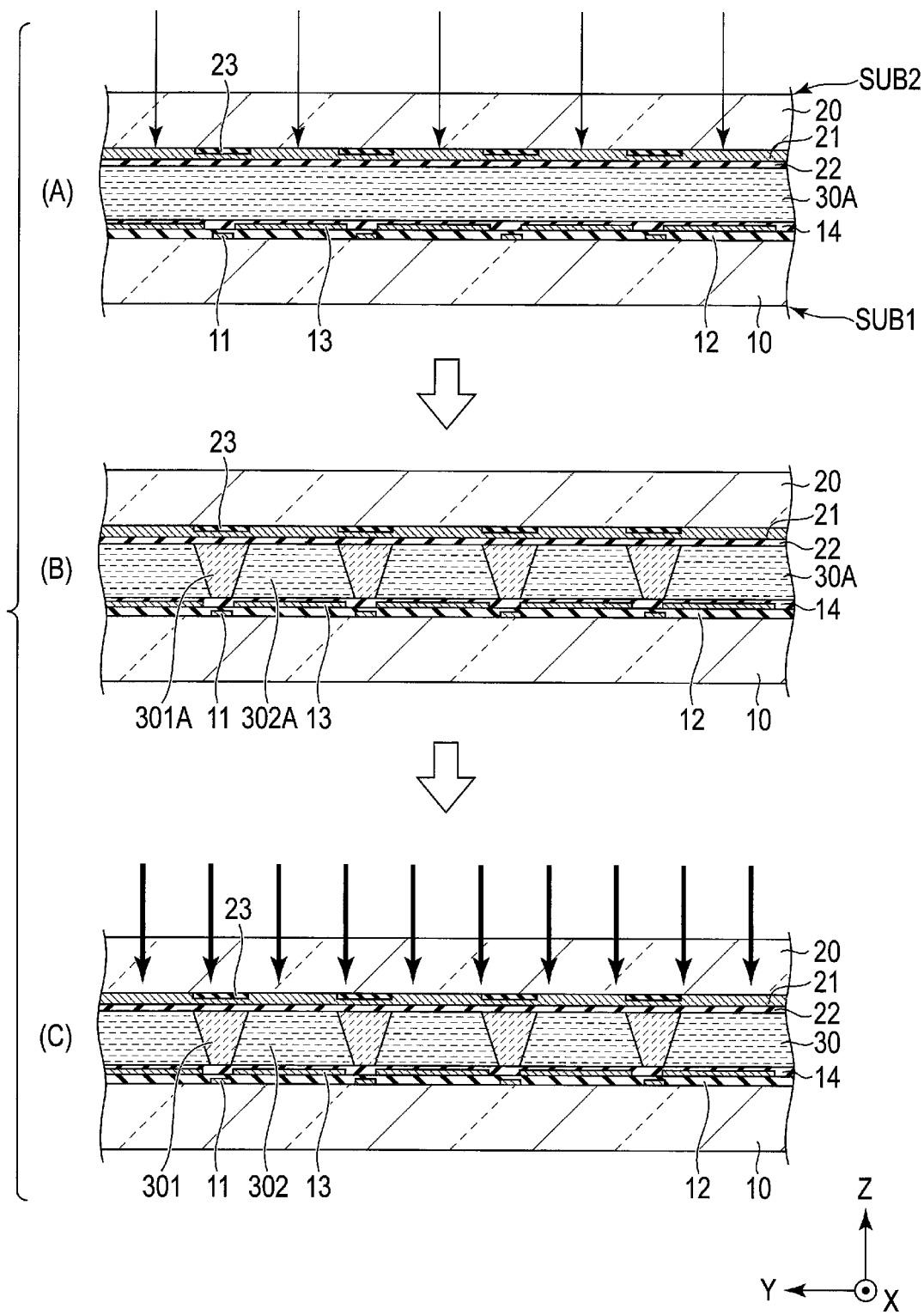
FIG. 15 is an illustration for explanation of a method of forming the liquid crystal layer 30 of the second configuration example.

FIG. 15 is an illustration for explanation of a method of forming the liquid crystal layer 30 of the second configuration example. As shown in FIG. 15(A), the liquid crystal material 30A is disposed between the alignment films 14 and 21 subjected to alignment treatment, and the entire surface of the transparent substrate 20 is exposed to ultraviolet light, not through the photomask (first exposure step). At this time, the light-shielding layer 23 blocks ultraviolet light in the areas overlapping the conductive lines 11. In other words, the light-shielding layer 23 corresponds to the shield portion. For this reason, the only areas overlapping the pixel electrodes 13 are exposed in the liquid crystal material 30A. Thus, as shown in FIG. 15(B), the liquid crystal material 30A is separated into unexposed areas 301A overlapping the conductive lines 11 and exposed areas 302A overlapping the pixel electrodes 13. More liquid crystal monomers are polymerized and polymers shaped in a thick streak are formed in the exposed areas 302A, similarly to the case explained with reference to FIG. 13.

After that, as shown in FIG. 15(C), the entire surface of the transparent substrate 20 is exposed to ultraviolet light, not through the photomask (second exposure step). The second illumination of ultraviolet light applied in the second exposure step is higher than the first illumination of ultraviolet light applied in the first exposure step, but the first exposure amount in the first exposure step is equivalent to the second exposure amount in the second exposure step. The ultraviolet light expands into the area overlapping the light-shielding layer 23, the liquid crystal monomers are polymerized on the entire area of the liquid crystal material 30A, and the polymer is formed. A number of polymers shaped in a thin streak are formed in the area overlapping the light-shielding layer 23, similarly to the case explained with reference to FIG. 13. The unexposed areas 301A become the first areas 301, and the exposed areas 302A become the second areas 302.

In the second configuration example, too, the same advantages as those of the first configuration example can be obtained.

FIG. 16 is a cross-sectional view showing a third configuration example of the display panel PNL shown in FIG. 2. The third configuration example is different from the first configuration example shown in FIG. 3 with respect to a feature of comprising protrusions CV which overlap the conductive lines 11. The protrusions CV are located between the first substrate SUB1 and the second substrate SUB2, and extend in the extending direction of the conductive lines 11. In the example illustrated, the protrusions CV are located between the conductive lines 11 and the common electrode 21. The protrusions CV and the conductive lines 11 extend in the first direction X. The protrusions CV are in contact with both of the first substrate SUB1 and the second substrate SUB2. In other words, the liquid crystal layer 30 is not interposed between the protrusions CV and the first substrate SUB1 or between the protrusions CV and the second substrate SUB2. The liquid crystal layer 30 contains the polymers 31 and the liquid crystal molecules 32, similarly to the first configuration example.

For example, the protrusions CV are provided on the second substrate SUB2. A width WCV of the protrusion CV in the second direction Y on the first substrate SUB1 side is smaller than that on the second substrate SUB2 side. The width WCV may be constant in the third direction Z or the width on the first substrate SUB1 side may be larger than that on the second substrate SUB2 side. The width WCV is desirably larger than or equal to the width W11 of the conductive line 11.

The protrusions CV are formed of a transparent resin material. The protrusions CV intersect the direction of propagation of the light from the light-emitting element LS but allow the light from the light-emitting element LS to be transmitted, similarly to the first area 301.

According to the third configuration example, the liquid crystal layer 30 is not interposed in the areas overlapping the conductive lines 11. In other words, when the potential difference is formed between the conductive lines 11 and the common electrode 21, a liquid crystal layer 30 which could be in the scattering state by the electric field is not present. For this reason, undesired scattering can be suppressed in the area overlapping the conductive lines 11. Deterioration in display quality can be therefore suppressed. In addition, attenuation of the light from light-emitting element LS which results from undesired scattering can be suppressed and the efficiency of use of the light can be improved. In addition, the protrusions CV are in contact with both of the first substrate SUB1 and the second substrate SUB2 and can hold a cell gap to form the liquid crystal layer 30.

The resin material to form the protrusions CV desirably has a refractive index equivalent to that of the material to form the liquid crystal layer 30. Undesired reflection and scattering can be thereby suppressed in an interface between the protrusions CV and the liquid crystal layer 30. In addition, the resin material to form the protrusions CV desirably has a high dielectric constant as compared with the material to form the liquid crystal layer 30. Thus, when the potential difference is formed between the conductive lines 11 and the common electrode 21, the electric field is confined within the protrusions CV and light leakage caused by applying an undesired electric field to the liquid crystal layer 30 can be suppressed.

In addition, the width WCV of the protrusion CV on the first substrate SUB1 side is smaller than that on the second substrate SUB2 side. For this reason, even if the electric field proceeding from the conductive lines 11 toward the common electrode 21 extends from the first substrate SUB1 to the second substrate SUB2 in the second direction Y, the electric field is confined within the protrusions CV. For this reason, light leakage from the liquid crystal layer 30 can be suppressed.

Figure 17:
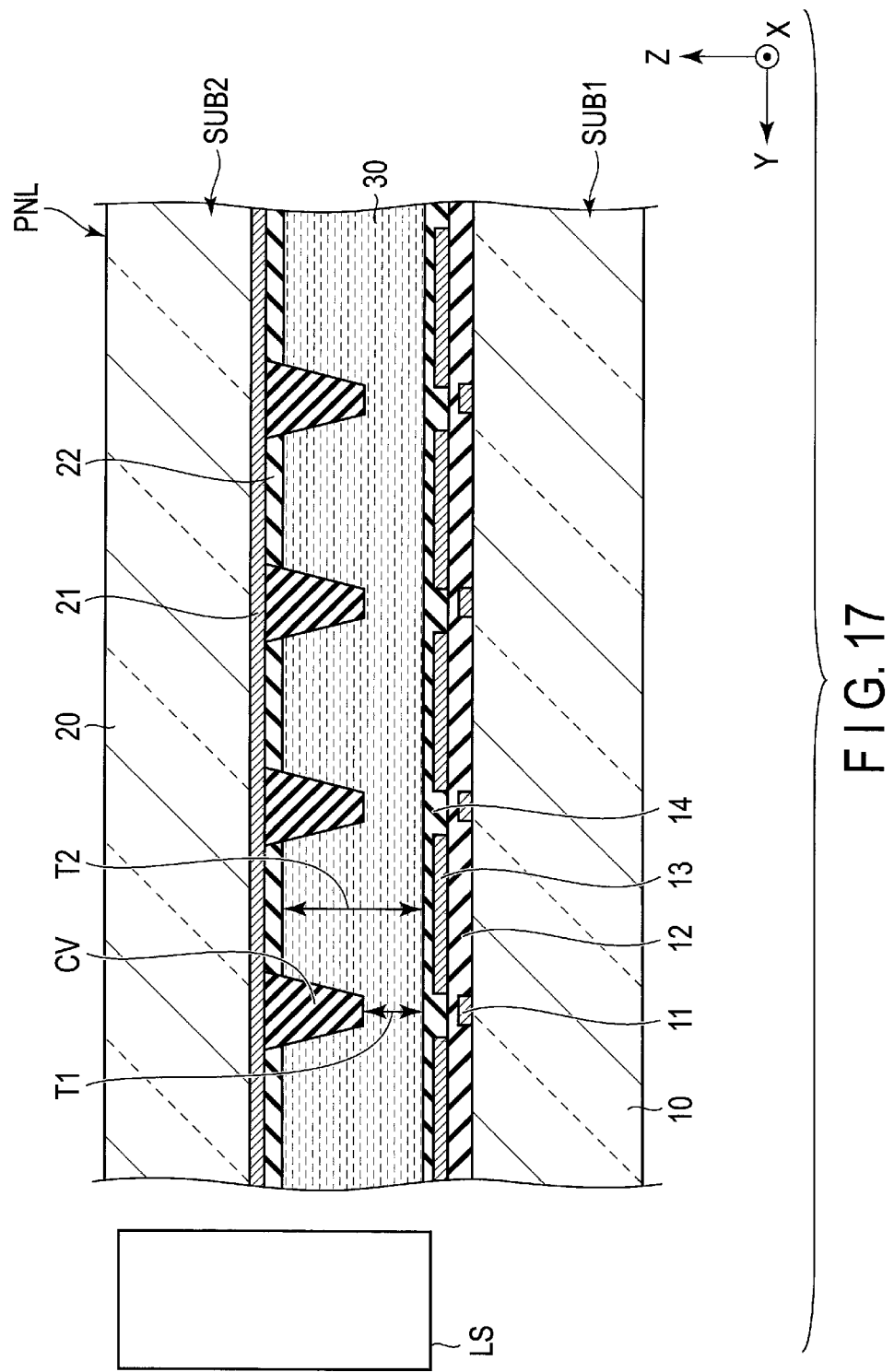
FIG. 17 is a cross-sectional view showing a first modified example of the third configuration example.

FIG. 17 is a cross-sectional view showing a first modified example of the third configuration example. The protrusions CV are in contact with the second substrate SUB2 while being remote from the first substrate SUB1. In other words, the liquid crystal layer 30 is interposed between the protrusions CV and the first substrate SUB1. However, a thickness T1 of the liquid crystal layer 30 located between the conductive line 11 and the protrusion CV is smaller than a thickness T2 of the liquid crystal layer 30 located between the pixel electrode 13 and the common electrode 21. The thickness indicates a distance in the third direction Z.

In the first modified example, the volume of the liquid crystal layer 30 in the areas overlapping the conductive lines 11 can be reduced as compared with a case where the protrusions CV are not provided. In addition, the potential difference formed between the conductive lines 11 and the common electrode 21 is distributed to the protrusions CV and the liquid crystal layer 30. For this reason, the potential difference applied to the liquid crystal layer 30 can be reduced as compared with a case where the protrusions CV are not provided. Furthermore, if the material to form the protrusions CV has a dielectric constant higher than the material to form the liquid crystal layer 30, the potential difference distributed to the liquid crystal layer 30 can be further reduced. Undesired light leakage can be therefore suppressed in the areas overlapping the conductive lines 11. In addition, since the protrusions CV are remote from the first substrate SUB1, the fluidity in the second direction Y of the liquid crystal material 30A disposed between the first substrate SUB1 and the second substrate SUB2 can be secured when the liquid crystal layer 30 is formed.

Figure 18:
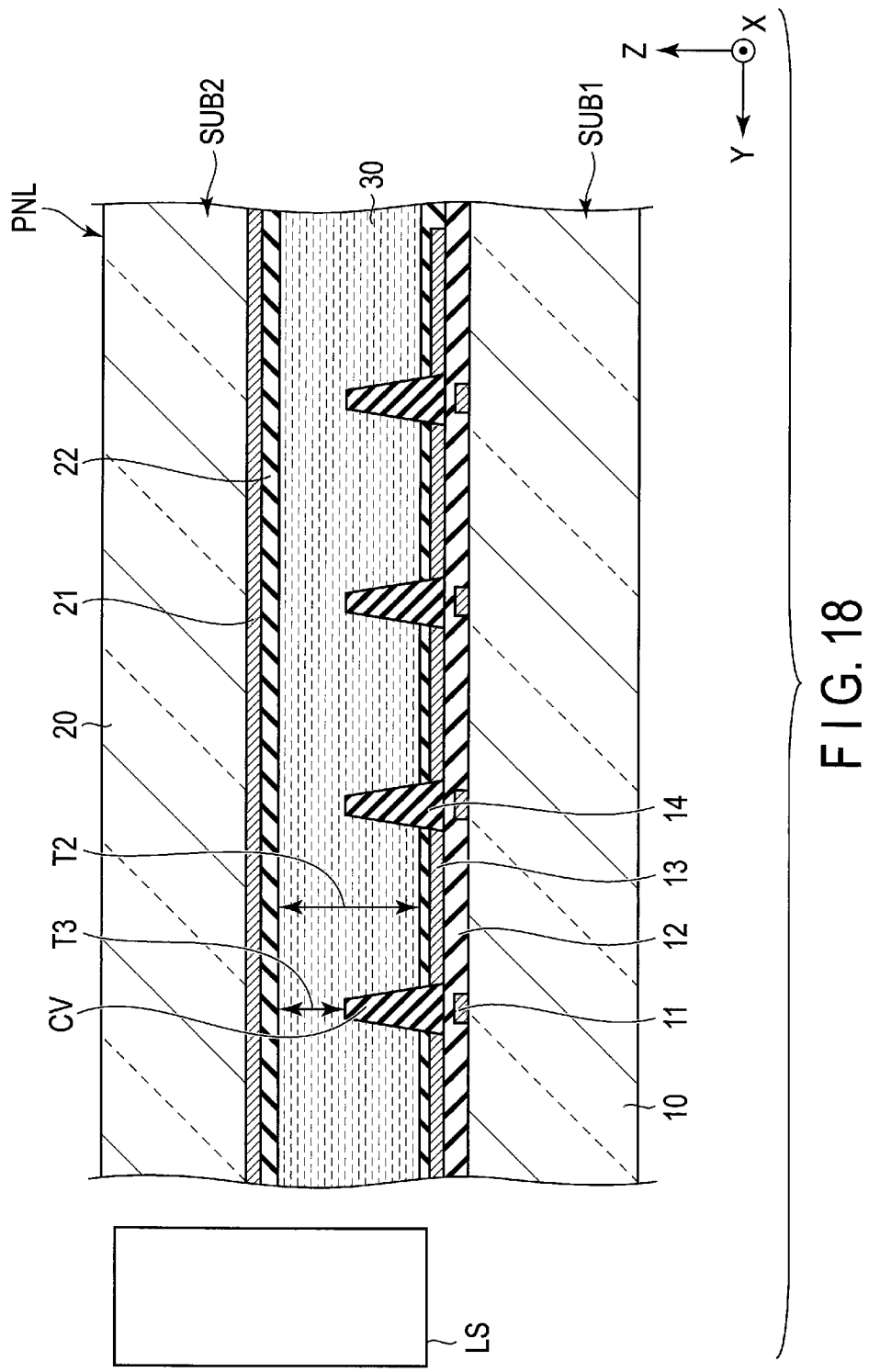
FIG. 18 is a cross-sectional view showing a second modified example of the third configuration example.

FIG. 18 is a cross-sectional view showing a second modified example of the third configuration example. The protrusions CV are in contact with the first substrate SUB1 while being remote from the second substrate SUB2. In other words, the liquid crystal layer 30 is interposed between the protrusions CV and the second substrate SUB2. However, a thickness T3 of the liquid crystal layer 30 located between the protrusion CV and the common electrode 21 is smaller than the thickness T2 of the liquid crystal layer 30 located between the pixel electrode 13 and the common electrode 21.

In the second modified example, too, the same advantages as those of the first modified example can be obtained.

Figure 19:
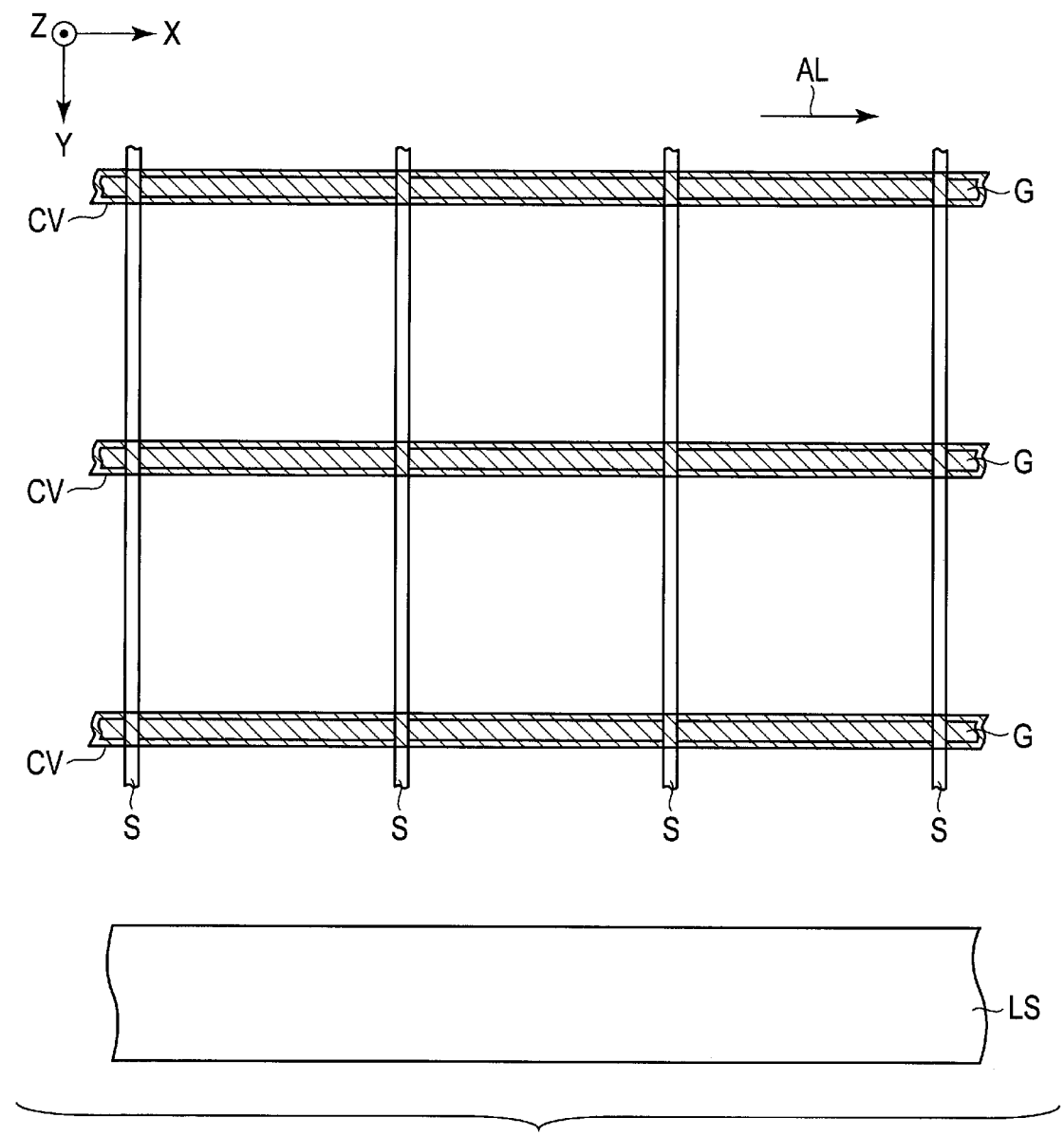
FIG. 19 is a plan view showing an example of a protrusion CV.

FIG. 19 is a plan view showing an example of a protrusion CV. In the third configuration example, the conductive lines 11 shown in FIG. 16 and the like are, for example, the scanning lines G. The scanning lines G overlap the protrusions CV in planar view. The shape of the protrusions CV may be any one of the shapes shown in FIG. 16 to FIG. 18. Each of the scanning lines G and the protrusions CV extends in the alignment treatment direction AL or the first direction X. In the example illustrated, the protrusions CV do not extend in the second direction Y. The protrusions CV extend linearly and sequentially in the first direction X, but may be partially cut in the middle from the viewpoint of improving the fluidity of the liquid crystal material.

According to the example illustrated, undesired scattering can be suppressed in the areas overlapping the scanning lines G.

Figure 20:
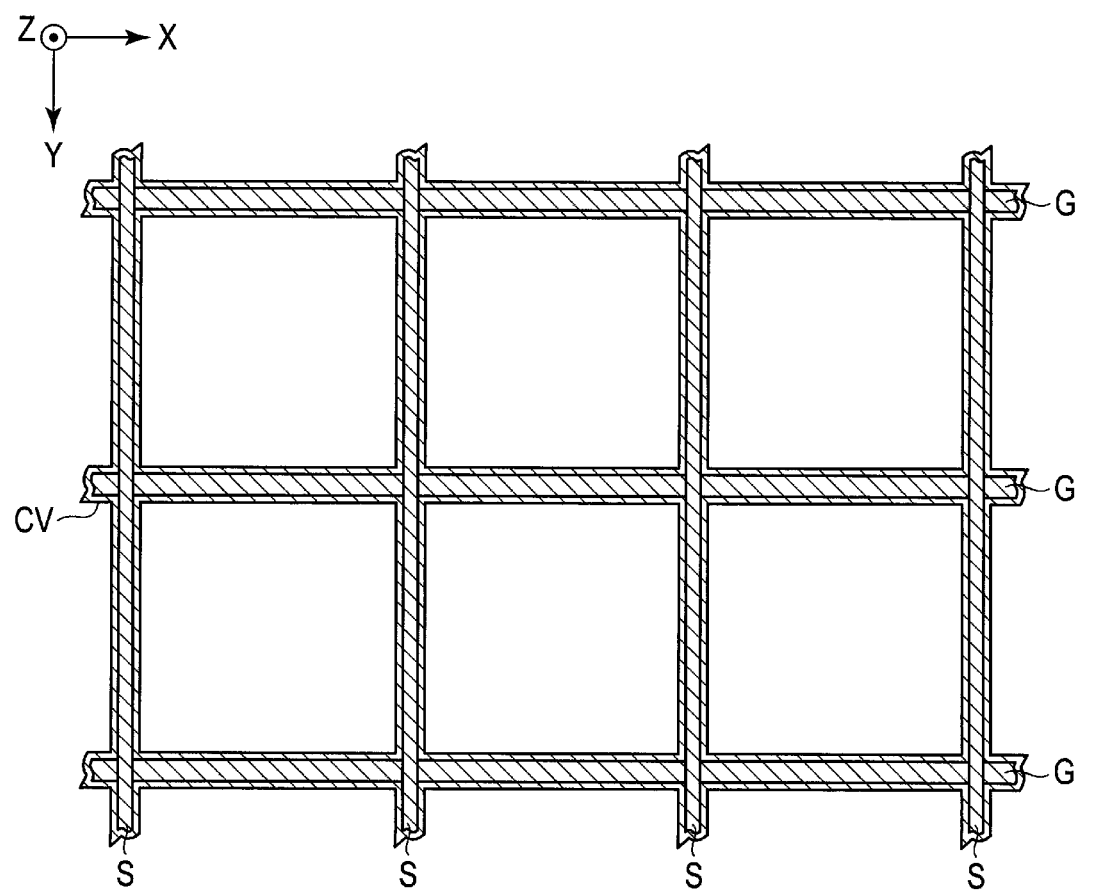
FIG. 20 is a plan view showing another example of the protrusion CV.

FIG. 20 is a plan view showing another example of the protrusion CV. The example shown in FIG. 20 is different from the example shown in FIG. 19 with respect to a feature that the protrusions CV extend not only in the first direction X but also in the second direction Y. The scanning lines G and the signal lines S overlap the protrusions CV in planar view. In the example illustrated, too, the protrusions CV may be partially broken.

According to the example illustrated, undesired scattering can also be suppressed in not only the areas overlapping the scanning lines G, but also the areas overlapping the signal lines S.

Figure 21:
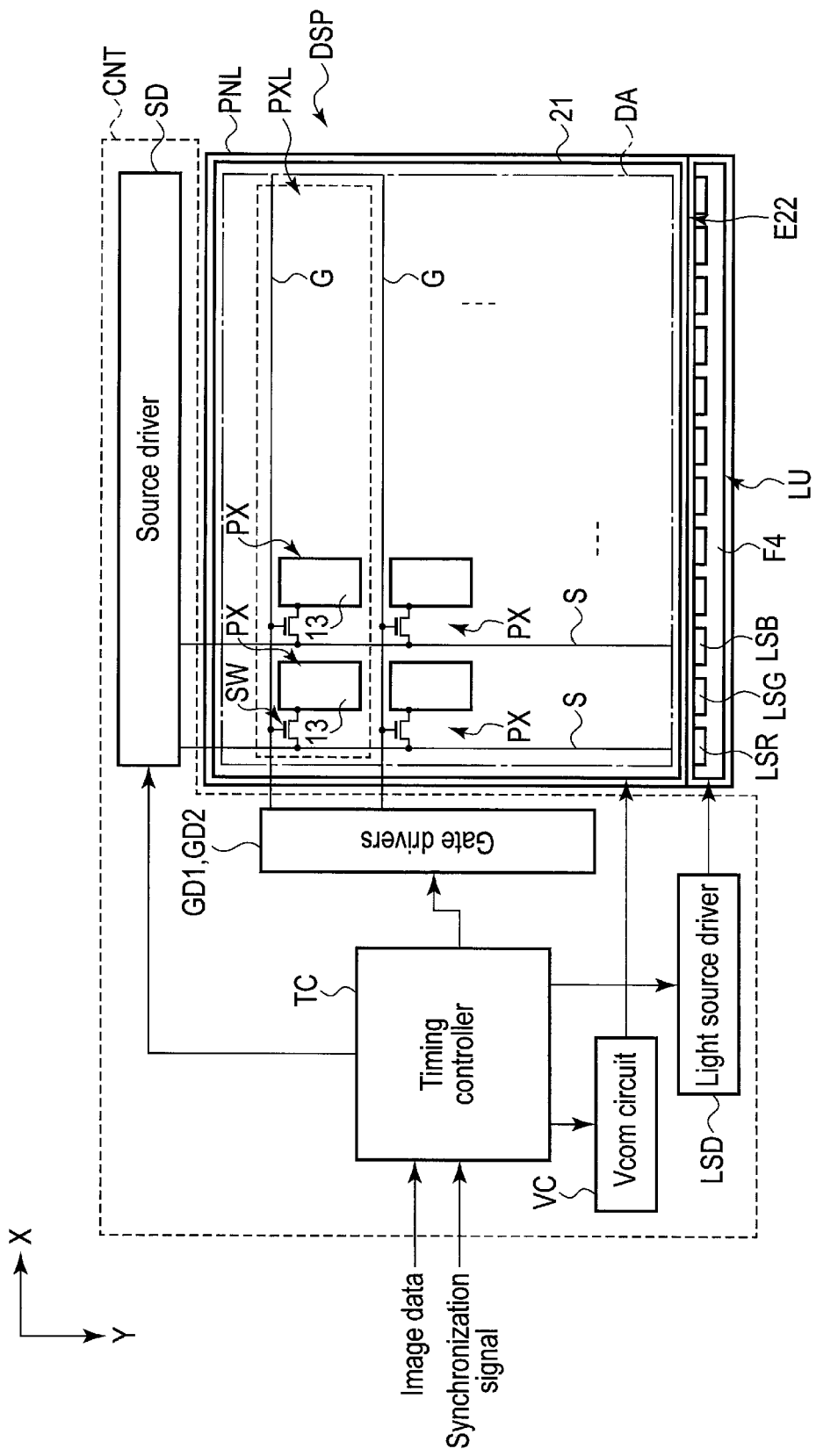
FIG. 21 is a diagram showing main constituent elements of the display device DSP shown in FIG. 1.

FIG. 21 is a diagram showing main constituent elements of the display device DSP shown in FIG. 1. The display device DSP comprises a controller CNT represented by a dotted line in the figure. The controller CNT comprises a timing controller TC, gate drivers GD1 and GD2, a source driver SD, a Vcom circuit VC, a light source driver LSD, and the like. The timing controller TC generates various signals, based on image data, a synchronization signal, and the like input from the outside. For example, the timing controller TC outputs a video signal generated by subjecting the image data to predetermined signal processing to the source driver SD. In addition, the timing controller TC outputs the control signal generated based on the synchronization signal to each of the gate drivers GD1 and GD2, the source driver SD, the Vcom circuit VC, and the light source driver LSD.

The scan signal is supplied from the gate driver GD1 or GD2 to each of the scanning lines G. The video signal is supplied from the source driver SD to each of the signal lines S. The common voltage is supplied from the Vcom circuit VC to the common electrode 21. The video signal supplied to the signal line S is applied to the pixel electrode 13 connected to the switching element SW, based on the scan signal supplied to the scanning line G, in a period in which the switching element SW becomes conductive. A high-level voltage is applied to the scanning line G as a scan signal in a period in which the switching element SW becomes conductive, and a low-level voltage is applied to the scanning line G as a scan signal in a period in which the switching element SW becomes nonconductive. For example, the high-level voltage is +20V and the low-level voltage is −20V. If the voltage of 0V is set as a common voltage in the common electrode 21, a potential difference of 20V is generated not only between the common electrode 21 and the scanning line G to which the high-level voltage is applied, but also between the common electrode 21 and the scanning line G to which the low-level voltage is applied. In the embodiments, light leakage resulting from the undesired scattering of the liquid crystal layer 30 can be suppressed between the scanning line G and the common electrode 21, by employing the above-explained first to third configuration examples.

A light source unit LU comprises, for example, a light-emitting element (first light-emitting element) LSR which emits light of a first color, a light-emitting element (second light-emitting element) LSG which emits light of a second color, and a light-emitting element (third light-emitting element) LSB which emits light of a third color. For example, the first color is red, the second color is green, and the third color is blue. A dominant emission wavelength of the light-emitting element LSR is, for example, 622 nm. A dominant emission wavelength of the light-emitting element LSG is, for example, 531 nm. A dominant emission wavelength of the light-emitting element LSB is, for example, 466 nm. The light-emitting elements LSR, LSG, and LSB are arranged in the extending direction of the scanning lines G (above-explained first direction X). In addition, the light-emitting elements LSR, LSG, and LSB are opposed to the end portion E22.

The light source driver LSD controls a lighting period of the light-emitting elements LSR, LSG, and LSB in accordance with the control signal from the timing controller TC, and the like. In a driving system in which a one-frame period includes sub-frame (field) periods, at least one of three light-emitting elements LSR, LSG, and LSB is turned on in each of the sub-frames such that the color of the illumination light is changed in each sub-frame. In the embodiments, the protrusions CV extending in the direction which intersects the direction of propagation of the light from the light-emitting elements LS is applied to the third configuration example. Since the protrusions CV are transparent, the protrusions CV hardly absorb the light from any one of the light-emitting elements LSR, LSG, and LSB.

FIG. 22 is an illustration for explanation of a method of measuring an absorption index of a sample. A light source 101 emits reference light to a sample SP. A detector 102 measures a transmittance of the light transmitted through the sample SP. A detector 103 measures a reflectance of the light reflected from the sample SP. The light source 101, the detector 102, and the detector 103 are installed such that an angle of incidence $\theta i$ of the reference light to the sample SP, an angle of transmission $\theta t$ of the light transmitted through the sample SP, and the angle of reflection $\theta r$ of the light reflected from the sample SP are set at predetermined values. For example, the angle of incidence $\theta i$, the angle of transmission $\theta t$, and the angle of reflection $\theta r$ are equally set at, for example, five degrees. If the absorption index (%), the transmittance (%), and the reflectance (%) of the sample SP represent as A, T, and R, respectively, the absorption index A can be defined as follows.

$$A=100-T-R$$

where it is assumed that haze of the sample SP and scattering on the sample SP can be neglected and that the surface of the sample SP is plain.

FIG. 23 is a graph showing measurement results of an absorption index of a material forming the protrusion CV. In the graph, the horizontal axis represents a wavelength (nm) and the vertical axis represents an absorption index (%). An absorption index of a material (sample A) for forming the protrusions CV of the embodiments and an absorption index of a material (sample B) for forming the spacer of the general liquid crystal display device were measured by the measuring method explained with reference to FIG. 22.

It was confirmed that the absorption indexes of the blue and green wavelengths in Sample B exceeded 1%. It was confirmed that the absorption index within a wavelength range from 430 nm to 680 nm in Sample A was 1% or less. The dominant emission wavelengths of the light-emitting elements employed in the light source unit LU are 466 nm, 531 nm, and 622 nm as explained wit reference to FIG. 21. Sample A hardly absorbs the light from any one of the light-emitting elements of the light source unit LU. For this reason, if the protrusions CV extending in the direction intersecting the direction of propagation of the light emitted from the light-emitting element are employed, the light from the light-emitting element is hardly absorbed and the reduction in the efficiency of use of the light can be suppressed.

As explained above, a display device capable of suppressing the deterioration in display quality can be provided by the present embodiments.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. For example, some structural elements may be deleted from the entire structural elements in the embodiments. Furthermore, structural elements described in different embodiments may be combined suitably.

In the above-explained embodiments, the first to third configuration examples employing the polymer dispersed liquid crystal for the display panel PNL have been explained, but the first to third configuration examples may be employed in an illumination device combined with a transmissive display panel or a reflective display panel. According to the illumination device, the scattering state and the transparent state can be changed on not only the entire surface, but also a partial surface of the display area DA. In addition, loss resulting from undesired scattering and undesired absorption can be reduced and the efficiency of use of the light can be improved.

Examples of the display device which can be obtained from the configurations described in the present specification will be hereinafter explained.

(1) A display device, comprising:
a first substrate comprising a scanning line and a pixel electrode;
a second substrate opposed to the first substrate; and a liquid crystal layer held between the first substrate and the second substrate and including streaky polymers and liquid crystal molecules, wherein the liquid crystal layer includes a first area overlapping the scanning line and a second area overlapping the pixel electrode, and the polymers of the first area are denser than the polymers of the second area.

(2) The display device of (1), wherein the polymer of the first area is thinner than the polymer of the second area.

(3) The display device of (1) or (2), wherein the first substrate further comprises an alignment film, and the scanning line, and the polymer of the first area extend in an alignment treatment direction of the alignment film.

(4) The display device of (3), further comprising:

a light source, wherein the light source is opposed to an end portion of at least one of the first substrate and the second substrate, and the end portion extends in the alignment treatment direction.

(5) The display device of any one of (1) to (4), wherein the second substrate does not comprise a light-shielding layer at a position overlapping the scanning line.

(6) The display device of any one of (1) to (4), wherein the second substrate comprises a light-shielding layer at a position overlapping the scanning line, and a width of the light-shielding layer is larger than or equal to a width of the scanning line.

(7) A display device, comprising:

a first substrate comprising a high-voltage line, a low-voltage line intersecting the high-voltage line, and a pixel electrode;

a second substrate opposed to the first substrate; and a liquid crystal layer held between the first substrate and the second substrate and including streaky polymers and liquid crystal molecules, wherein the liquid crystal layer includes a first area overlapping the high-voltage line and a second area overlapping the pixel electrode, and a threshold voltage of the first area is higher than a potential difference formed on the high-voltage line.

(8) The display device of (7), wherein the threshold voltage of the first area is higher than a threshold voltage of the second area.

(9) The display device of (7) or (8), wherein the polymers of the first area are denser than the polymers of the second area.

(10) The display device of any one of (7) to (9), wherein the polymer of the first area is formed in a streaky shape extending along the high-voltage line.

(11) A method of manufacturing a display device, comprising:

a first exposure step of disposing a liquid crystal material obtained by dispersing liquid crystal molecules in a liquid crystal monomer, between a first substrate comprising scanning lines and a second substrate, and exposing the liquid crystal material to ultraviolet light of a first illumination via a light-shield portion overlapping the scanning lines; and a second exposure step of exposing the liquid crystal material to ultraviolet light of a second illumination higher than the first illumination.

(12) The method of (10), wherein a first exposure amount in the first exposure step is equivalent to a second exposure amount in the second exposure step.

(13) The method of (11) or (12), wherein a photomask including the light-shield portion is employed in the first exposure step, and an entire surface of the liquid crystal material is exposed without employing the photomask, in the second exposure step.

(14) The method of (11) or (12), wherein the substrate comprises the light-shield portion overlapping the scanning line, and an entire surface of the second substrate is exposed in the first and second exposure steps.

(15) A display device, comprising:

a first substrate comprising a scanning line and a pixel electrode;

a second substrate opposed to the first substrate;

a liquid crystal layer held between the first substrate and the second substrate and including streaky polymers and liquid crystal molecules; and a protrusion located between the first substrate and the second substrate, overlapping the scanning line, extending in an extending direction of the scanning line, and formed of a transparent resin material.

(16) The display device of (15), wherein the protrusion is in contact with at least one of the first substrate and the second substrate.

(17) The display device of (15) or (16), further comprising:

light sources opposed to an end portion of at least one of the first substrate and the second substrate, wherein the light sources are arranged in the extending direction.

(18) The display device of (17), wherein the protrusion has an absorption index of 1% or less within a wavelength range of 430 nm to 680 nm.

What is claimed is:

1. A display device, comprising:
    a first substrate comprising a scanning line and a pixel electrode;
    a second substrate opposed to the first substrate; and
    a liquid crystal layer held between the first substrate and the second substrate and including streaky polymers and liquid crystal molecules, wherein
    the liquid crystal layer includes a first area overlapping the scanning line and a second area overlapping the pixel electrode,
    the polymers of the first area are denser than the polymers of the second area,
    the polymer of the first area is thinner than the polymer of the second area,
    the first area has a first width on the first substrate side and a second width on the second substrate side, and
    the first width is smaller than the second width and is larger than or equal to the width of the scanning line.

2. The display device of claim 1, wherein the polymer of the first area and the polymer of the second area are formed of same liquid crystal monomers.

3. The display device of claim 2, wherein
    the first substrate further comprises an alignment film, and
    the scanning line, and the polymer of the first area extend in an alignment treatment direction of the alignment film.

4. The display device of claim 3, further comprising:
    a light source,
    wherein
    the light source is opposed to an end portion of at least one of the first substrate and the second substrate, and
    the end portion extends in the alignment treatment direction.

5. The display device of claim 1, wherein the second substrate does not comprise a light-shielding layer at a position overlapping the scanning line.

6. The display device of claim 1, wherein
the second substrate comprises a light-shielding layer at a position overlapping the scanning line, and
a width of the light-shielding layer is larger than or equal to a width of the scanning line.

7. The display device of claim 1, wherein
the first substrate further comprises the scanning lines,
the scanning lines extend in a first direction, and are arranged at intervals in a second direction, and
the second area extends in the first direction at a position between the adjacent scanning lines.

8. The display device of claim 7, wherein
the first substrate further comprises a signal line intersecting the scanning lines, and
the first area and the second area intersect the signal line.

9. The display device of claim 8, wherein
the first substrate further comprises the pixel electrodes arranged in the first direction, and
the second area overlaps the pixel electrodes.

10. The display device of claim 1, wherein
the first substrate further comprises the scanning lines, and signal lines intersecting the scanning lines,
the first area overlaps the scanning lines and the signal lines, and
the first area is formed in a grating shape.

11. A display device, comprising: a first substrate comprising a high-voltage line, a low-voltage line intersecting the high-voltage line, and a pixel electrode; a second substrate opposed to the first substrate; and a liquid crystal layer held between the first substrate and the second substrate and including streaky polymers and liquid crystal molecules, wherein the liquid crystal layer includes a first area overlapping the high-voltage, line and a second area overlapping the pixel electrode, a threshold voltage of the first area is higher than a potential difference formed on the high-voltage line, the polymers of the first area are denser than the polymers of the second area, the polymer of the first area is thinner than the polymer of the second area, the first area has a first width one the first substrate side and a second width on the second substrate side, and the first width is smaller than the second width and is larger than or equal to the width of a scanning line.

12. The display device of claim 11, wherein the threshold voltage of the first area is higher than a threshold voltage of the second area.

13. The display device of claim 11, wherein the polymer of the first area is formed in a streaky shape extending along the high-voltage line.

14. The display device of claim 11, wherein the second area intersects the low-voltage line.

15. The display device of claim 11, wherein the first area overlaps the low-voltage line.

16. The display device of claim 11, wherein the second substrate does not comprise a light-shielding layer at a position overlapping the scanning line.

* * * * *